(12) United States Patent
Madden et al.

(10) Patent No.: US 11,978,256 B2
(45) Date of Patent: May 7, 2024

(54) FACE CONCEALMENT DETECTION

(71) Applicant: Alarm.com Incorporated, Tysons, VA (US)

(72) Inventors: Donald Madden, Columbia, MD (US); Achyut Boggaram, McLean, VA (US); Gang Qian, McLean, VA (US); Daniel Todd Kerzner, McLean, VA (US)

(73) Assignee: Alarm.com Incorporated, Tysons, VA (US)

( * ) Notice: Subject to any disclaimer, the term of this patent is extended or adjusted under 35 U.S.C. 154(b) by 533 days.

(21) Appl. No.: 17/205,071

(22) Filed: Mar. 18, 2021

(65) Prior Publication Data

US 2021/0201005 A1 Jul. 1, 2021

Related U.S. Application Data

(63) Continuation of application No. 16/261,879, filed on Jan. 30, 2019, now Pat. No. 10,963,681.
(Continued)

(51) Int. Cl.
*G06V 20/52* (2022.01)
*G06F 18/25* (2023.01)
(Continued)

(52) U.S. Cl.
CPC ............ *G06V 20/52* (2022.01); *G06F 18/251* (2023.01); *G06V 40/10* (2022.01); *G06V 40/161* (2022.01);
(Continued)

(58) Field of Classification Search
None
See application file for complete search history.

(56) References Cited

U.S. PATENT DOCUMENTS 8,494,227 B2 7/2013 Prokoski
8,922,342 B1 12/2014 Ashenfelter et al.
(Continued)

FOREIGN PATENT DOCUMENTS

EP 1703437 9/2006
WO WO2017212901 12/2017

OTHER PUBLICATIONS

PCT International Search Report and Written Opinion in International Application No. PCT/US2019/015777, dated May 6, 2019, 15 pages.
(Continued)

*Primary Examiner* — Samah A Beg
(74) *Attorney, Agent, or Firm* — Fish & Richardson P.C.

(57) ABSTRACT

A monitoring system is configured to monitor a property. The monitoring system includes a camera, a sensor, and a monitor control unit. The monitor control unit is configured to receive image data and sensor data. The monitor control unit is configured to determine that the image data includes a representation of a person. The monitor control unit is configured to determine an orientation of a representation of a head of the person. The monitor control unit is configured to determine that the representation of the head of the person likely includes a representation of a face of the person. The monitor control unit is configured to determine that the face of the person is likely concealed. The monitor control unit is configured to determine a malicious intent score that reflects a likelihood that the person has a malicious intent. The monitor control unit is configured to perform an action.

20 Claims, 6 Drawing Sheets

Related U.S. Application Data

(60) Provisional application No. 62/623,823, filed on Jan. 30, 2018.

(51) Int. Cl.
  *G06V 40/10* (2022.01)
  *G06V 40/16* (2022.01)
  *G06V 40/20* (2022.01)
  *G08B 13/196* (2006.01)

(52) U.S. Cl.
  CPC ............ *G06V 40/167* (2022.01); *G06V 40/20* (2022.01); *G08B 13/19602* (2013.01)

(56) References Cited

U.S. PATENT DOCUMENTS

| | | | |
|---|---|---|---|
| 9,953,211 B2* | 4/2018 | Hayasaka | G06V 40/171 |
| 11,704,908 B1* | 7/2023 | Xu | G06V 40/172 |
| | | | 382/181 |
| 2002/0105410 A1 | 8/2002 | Mann | |
| 2007/0013493 A1 | 1/2007 | Liaw | |
| 2007/0014439 A1* | 1/2007 | Ando | G08B 31/00 |
| | | | 382/118 |
| 2011/0135165 A1* | 6/2011 | Wechsler | G06F 18/211 |
| | | | 382/118 |
| 2013/0243274 A1* | 9/2013 | Sukegawa | G06V 40/16 |
| | | | 382/118 |
| 2014/0071287 A1 | 3/2014 | Tu et al. | |
| 2017/0148290 A1 | 5/2017 | Yang et al. | |
| 2017/0278348 A1 | 9/2017 | Takeda | |
| 2017/0344858 A1 | 11/2017 | Ohira et al. | |
| 2017/0352015 A1 | 12/2017 | Xu et al. | |
| 2018/0081539 A1 | 3/2018 | Ghassabian | |
| 2018/0247504 A1 | 8/2018 | Siminoff et al. | |
| 2019/0108407 A1 | 4/2019 | Okayasu | |
| 2019/0139217 A1 | 5/2019 | Szu | |
| 2019/0246075 A1 | 8/2019 | Khadloya et al. | |
| 2020/0012887 A1 | 1/2020 | Li et al. | |
| 2020/0180560 A1 | 6/2020 | Okada | |
| 2020/0210714 A1 | 7/2020 | Kato | |
| 2022/0028109 A1* | 1/2022 | Kang | G06V 40/161 |

OTHER PUBLICATIONS

International Preliminary Report on Patentability in International Application No. PCT/US2019/015777, dated Aug. 13, 2020, 9 pages.

* cited by examiner

FACE CONCEALMENT DETECTION

CROSS-REFERENCE TO RELATED APPLICATIONS

This application is a continuation of U.S. application Ser. No. 16/261,879, filed Jan. 30, 2019, now allowed, which claims the benefit of U.S. Application No. 62/623,823, filed Jan. 30, 2018. The complete disclosures of all of the above patent applications are hereby incorporated by reference in their entirety for all purposes.

TECHNICAL FIELD

This application generally relates to monitoring systems.

BACKGROUND

A person with malicious intent may conceal his face to hide his identity.

SUMMARY

Many property owners equip their properties with security monitoring systems to detect the presence of unexpected visitors or intruders. These security monitoring systems may include one or more cameras that provide video surveillance and/or still images, potentially enabling identification of unexpected persons. However, would-be criminals and other persons with malicious intent often don masks or employ other face-concealing measures to obscure their identities. As video surveillance techniques become more prevalent, criminals may don masks or employ face-concealing measures earlier in the lead up to the crime in order to avoid image capture of their actual face by, for example, a camera mounted outside of a home or store.

The systems and techniques disclosed herein analyze video and image data from one or more cameras of a security monitoring system to detect when a person on the property is wearing a mask or employing other face-concealing measures. Based on detection of facial concealment, as well as other monitoring system and context data, the monitoring system may predict the likelihood that the person has malicious intent and perform an appropriate action, such as notifying the property owner. Additionally, if a camera does happen to capture the person in the act of donning (i.e., putting on) or doffing (i.e., taking off) his mask, the system may detect this activity, bookmark any images in which the person's face may be visible, and store or send those images to a facial recognition system for identification.

The disclosed systems and techniques provide one or more of the following advantages. In some implementations, the image analysis may include liveness detection, enabling discrimination between real (natural) faces and masks that contain face-like features, improving the accuracy of facial-concealment detection. For example, the system may include a machine learning model, neural network, or classifier that is trained to distinguish real faces from known human-like masks (e.g., a clown mask, a mask depicting a famous celebrity or fictional character, or another mask containing face-like features). In another example, a machine learning model, neural network, or classifier may be trained to analyze the relative proportion of various facial features or detect facial movement, enabling better discrimination between artificial, static face masks and actual human faces.

In some implementations, by analyzing data from one or more sensors and/or external sources (e.g., the internet) in addition to video or image data, the system may distinguish legitimate from illegitimate facial concealment, improving the accuracy of the intent prediction. For example, in some cases, the system may analyze outdoor temperature data from a sensor on the property. The system may determine that, if the outdoor temperature is less than 32 degrees Fahrenheit, a visitor may be wearing a ski mask for the legitimate purpose of protecting his face from the weather, decreasing the likelihood that he has malicious intent. As another example, the system may analyze date and time-stamp information. The system may determine that, if it is Halloween, a visitor may be wearing a mask as part of a trick-or-treating costume, decreasing the likelihood that he has malicious intent.

In some implementations, the system may analyze data captured by one or more cameras on or near the property to detect a person donning or doffing the mask. By analyzing video frames that capture the act of donning or doffing the mask, the system may be able to identify and bookmark images in which the person's face is visible, possibly providing a means to identify the masked visitor.

According to an innovative aspect of the subject matter described in this application, a monitoring system is configured to monitor a property. The monitoring system includes a camera that is configured to generate image data that reflects a portion of the property; a sensor that is configured to generate sensor data that reflects an attribute of the property; and a monitor control unit. The monitor control unit is configured to receive the image data and the sensor data; determine that the image data includes a representation of a person; based on determining that the image data includes a representation of a person, determine an orientation of a representation of a head of the person; based on determining an orientation of the representation of the head of the person, determine that the representation of the head of the person likely includes a representation of a face of the person; determine that the face of the person is likely concealed; based on determining that the face of the person is likely concealed and based on the sensor data, determine a malicious intent score that reflects a likelihood that the person has a malicious intent; and based on the malicious intent score, perform a monitoring system action.

These and other implementations can each optionally include one or more of the following features. The monitor control unit is configured to determine that the face of the person is likely concealed by providing the image data as an input to a model that is configured to determine whether a received image includes a representation of a concealed face and that is trained using a first collection of images that each include a representation of a concealed face and a second collection of images that each include a representation of an unconcealed face. The monitor control unit is configured to compare the malicious intent score to a malicious intent score threshold; based on comparing the malicious intent score to the malicious intent score threshold, determine that the malicious intent score satisfies the malicious intent score threshold; and based on determining that the malicious intent score satisfies the malicious intent score threshold, perform the monitoring system action by escalating an armed status of the monitoring system.

The monitor control unit is configured to determine the malicious intent score threshold based on the armed status of the monitoring system. The monitor control unit is configured to, based on determining that the malicious intent score satisfies the malicious intent score threshold, perform the monitoring system action by transmitting, to a monitoring server, data indicating a location of the person who likely has the malicious intent. The monitoring server is configured to transmit data indicating the location of the person who likely has the malicious intent to other monitoring systems in a vicinity of the location of the person who likely has the malicious intent. The monitor control unit is configured to, based on determining that the malicious intent score satisfies the malicious intent score threshold, perform the monitoring system action by preventing the person who likely has the malicious intent from entering the property.

The monitor control unit is configured to compare the malicious intent score to a malicious intent score threshold; based on comparing the malicious intent score to the malicious intent score threshold, determine that the malicious intent score does not satisfy the malicious intent score threshold; and, based on determining that the malicious intent score does not satisfy the malicious intent score threshold, perform the monitoring system action by maintaining an armed status of the monitoring system. The monitor control unit is configured to, based on the image data and the sensor data, determine vital statics of the person including heart rate and respiration rate. The action of determining the malicious intent score that reflects the likelihood that the person has a malicious intent is further based on the vital statics of the person including heart rate and respiration rate. The camera is a video camera. The image data is video data. The monitor control unit is configured to, based on determining that the representation of the head of the person likely includes a representation of a face of the person, identify a sequence of frames of the video data that include a representation of the person donning or doffing a face cover. The action of determining the malicious intent score that reflects the likelihood that the person has a malicious intent is further based on identifying the sequence of frames of the video data that include the representation of the person donning or doffing the face cover. The sensor is a thermometer. The sensor data is temperature data. The monitor control unit is configured to receive the temperature data. The action of determining the malicious intent score that reflects the likelihood that the person has a malicious intent is further based on the temperature data.

Other implementations of this aspect include corresponding methods, apparatus, and computer programs recorded on computer storage devices, each configured to perform the functions of the system.

Particular implementations of the subject matter described in this specification can be implemented so as to realize one or more of the following advantages. A resident of a property may be alerted to a person near the property who may have a malicious intent.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
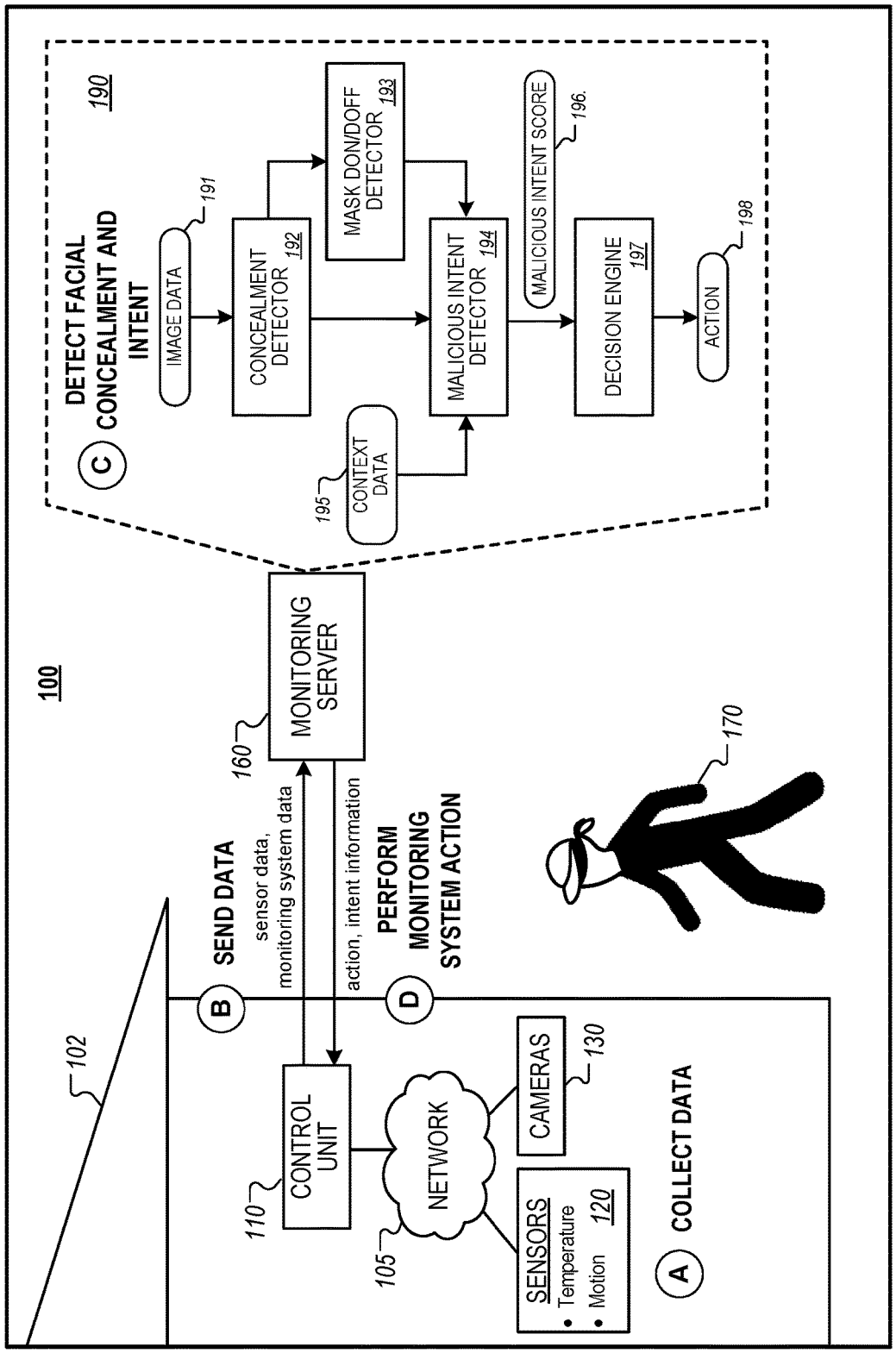
FIG. 1 is a diagram illustrating an example security monitoring system for detecting face concealment and malicious intent.

FIG. 1 is a diagram illustrating example security monitoring system 100 for detecting face concealment and malicious intent. The example system 100 includes a property 102, which is monitored by a security monitoring system that includes one or more sensors 120, including one or more cameras 130. A control unit 110 of the monitoring system sends sensor and other monitoring system data related to the property 102 to a remote monitoring server 160. The monitoring server 160 includes an analytics engine, which analyzes the data to detect whether a person on the property 102 has a concealed face. The server 160 may also determine the likelihood that the person has malicious intent. In some implementations, the monitoring server 160 may perform an action in response to detecting a person with a concealed face. For example, the monitoring server 160 may notify the owner of the property 102, send intent information to the control unit 110, or command the control unit 110 to sound an audible alarm of the monitoring system. FIG. 1 includes stages (A) through (D), which represent a flow of data.

The property 102 may be, for example, a residence, a home, a place of business, a store, an office, a factory, or other property that may be visited by one or more persons. The property 102 may include one or more structures, including a house, a garage, a shed, a store, or other building.

The property 102 is monitored by a security monitoring system that includes one or more sensors 120. The sensors 120 may include one or more cameras 130 that capture video and/or still images of the property 102. The cameras 130 may capture imagery from inside of a building on the property 102 (e.g., images in a room of the home, inside of a garage, inside of a store, etc.) or from outside of a building (e.g., images of the walk leading up to a house, in the parking lot of a store, etc.). In some implementations, one or more of the cameras 130 may be part of a doorbell camera or other device that monitors a point of entry to the property 102, such as a door or gate. The cameras 130 may use any type of imaging technology. For example, one or more of the cameras 130 may be conventional visible light cameras, IR cameras, or night vision cameras. The cameras 130 may collect monochrome (e.g., black and white) or multichannel (e.g., color) data. In some examples one or more of the cameras 130 may sense and collect depth or range information in addition to 2D image data (e.g., RGB-D cameras). In some implementations, one or more of the cameras 130 may be part of a motion-detection system.

The security monitoring system also includes one or more additional sensors 120 that monitor the property 102. The sensors 120 may include temperature, weather, or motion sensors mounted outside of a building on the property 102. In some implementations, the sensors 120 may be related to access points to the property 102. For example, a sensor 120 may detect whether an attempt was made to unlock or open a door, window, or other entry point. A sensor 120 may detect and report the status of the security system (e.g., armed, disarmed, etc.) and whether there was an attempt made to modify or downgrade the security system status.

In some implementations, one or more of the sensors 120, including one or more of the cameras 130, may be mounted on a robotic device or mobile drone. The drone may move about the property 102 under its own locomotion. In some cases, the drone may have propellers or other features that enable it to fly, hover, or land and balance on an elevated surface.

The cameras 130 and other sensors 120 communicate with a monitoring system control unit 110 located at the property 102. In some implementations, the control unit 110 may be a computer system or other electronic device configured to communicate with other monitoring system devices and perform various monitoring functions. For example, the control unit 110 may include a processor, a chipset, a memory system, or other computing hardware. In some cases, the control unit 110 may include application-specific hardware, such as a field-programmable gate array (FPGA), an application-specific integrated circuit (ASIC), or other embedded dedicated hardware. The control unit 110 may include software that configures the unit to perform the functions described in this disclosure The control unit 110 may perform various monitoring system functions. For example, the control unit 110 may receive and process data collected by the various sensors 120 and cameras 130 located on the property 102. The control unit 110 may maintain and monitor the status of the security system (e.g., armed, disarmed, home, away, etc.). The control unit 110 may also provide a means for an owner of the property 102 to configure the monitoring system, for example, through a physical interface (e.g., a touch screen or keyboard/button input) or network connection (e.g., through an authorized computer or mobile device of the property owner).

In some implementations, the sensors 120 and cameras 130 communicate with the control unit 110 through a network 105. The network 105 may be any communication infrastructure that supports the electronic exchange of data between the control unit 110 and other monitoring system devices. The network 105 may include a local area network (LAN), a wide area network (WAN), the Internet, or other network topology. The network 105 may be any one or combination of wireless or wired networks and may include any one or more of Ethernet, Bluetooth, and Wi-Fi technologies. Communications through the network 105 may be implemented through any one or combination of various protocols, including the 802.11 family of protocols, Bluetooth, Bluetooth LE, Z-Wave, ZigBee, or other custom or standard communication protocol. In some implementations, the network 105 may include optical data links.

To support communications through the network 105, the sensors 120, the cameras 130 and/or the control unit 110 may include communications modules, such as a modem, transceiver, modulator, or other hardware or software configured to enable the device to communicate electronically through the network 105.

The control unit 110 also communicates with a monitoring server 160, which may be remote from the property 102. The monitoring server 160 may be, for instance, one or more computer systems, server systems, or other computing devices. In some implementations, the monitoring server 160 may be a cloud computing platform.

In some implementations, the monitoring server 160 exchanges data electronically with the control unit 110 via a long-range data link. The long-range data link may include any combination of wired and wireless data networks. For example, the control unit 110 may exchange information with the monitoring server 160 through a wide-area-network (WAN), a cellular telephony network, a cable connection, a digital subscriber line (DSL), a satellite connection, or other electronic means for data transmission. The control unit 110 and the monitoring server 160 may exchange information using any one or more of various synchronous or asynchronous communication protocols, including the 802.11 family of protocols, GSM, 3G, 4G, 5G, LTE, CDMA-based data exchange or other techniques.

The control unit 110 may send any of various data to the monitoring server 160. For example, the control unit 110 may send raw or processed data from one or more sensors 120 or cameras 130. The control unit 110 may send data that indicates a status of the security system, or other monitoring system data.

The monitoring server 160 includes computing capabilities to receive, manipulate, process, and store data sent by the control unit 110. For example, the monitoring server 160 may include an analysis engine that processes and analyzes sensor and monitoring system data. The analysis engine may be implemented in any combination of hardware and software. In some implementations, the analysis engine may include one or more machine learning modules, neural networks, or other processing components.

In some implementations, the monitoring server 160 may exchange information with other networks and devices. For example, the monitoring server 160 may receive information about the property 102 through the internet (e.g., determining the outdoor temperature at the location of the property 102 by connecting to an internet-based weather service).

In some implementations, the monitoring server 160 may communicate with an authorized device of an owner of the property 102. The authorized device may be, for example, a portable personal computing device, such as a cellphone, a smartphone, a tablet, a mobile device, or other electronic device. In some examples, the authorized device may be an electronic home assistant or a smart speaker. The monitoring server 160 may communicate with the authorized device through any of various networks or protocols, including the network 105 or a cellular telephony or data network.

In some implementations, the monitoring server 160 may exchange information with an emergency response system. For example, the monitoring server 160 may alert emergency service personnel, such as security guards, police or fire department officers, or medical technicians to an emergency situation detected at the property 102.

In FIG. 1, a person 170 wearing a mask is present on the property 102. The person 170 may be any visitor to the property 102, for example, a delivery person, a salesperson, an unexpected acquaintance, an intruder, or a burglar.

In stage (A), the sensors 120 and cameras 130 of the monitoring system collect sensor data related to the property 102 and the person 170. The sensor data includes video or still images of the person 170 captured by one or more of the cameras 130.

The sensor data may also include, for example, temperature data collected by an outdoor temperature sensor 120 located at the property 102, as well as door status data (e.g., locked, unlocked, open, closed) recorded by a door sensor 120. The sensors 120 and cameras 130 send the sensor data to the control unit 110, possibly through the network 105.

In some implementations, the control unit 110 may process or analyze the sensor data provided by the sensors 120 and the cameras 130. For example, the control unit 110 may process image data to determine whether a person is present in a particular image. The control unit 110 may process the data to correlate readings from various sensors 120 with image data from the one or more cameras 130. For example, using a time stamp, the control unit 110 may associate a reading from a temperature sensor 120 with a particular image from a camera 130 to determine that the outdoor temperature was 5 degrees Fahrenheit when the image was recorded. In some examples, the control unit 110 may filter, downsample, truncate, annotate, or otherwise process some or all of the data.

The control unit 110 may also receive or generate various monitoring system data, including data that indicates a status of the monitoring system (e.g., armed, disarmed, home, away), or any other data related to the monitoring of property 102.

In stage (B), the control unit 110 sends sensor data and/or monitoring system data to the remote monitoring server 160. The control unit 110 may send any combination of raw or processed data to the monitoring server 160. The control unit 110 may send data including 2D or 3D image data, video data, temperature data, motion-detection data, or any other data collected or generated by devices of the monitoring system.

In stage (C), the monitoring server 160 analyzes the data received from the control unit 110 to detect facial concealment and intent of the person 170. In some implementations, the monitoring server 160 may determine an action the monitoring system should perform in response to the detected intent.

An example method for detecting facial concealment and malicious intent is shown in process 190. The process 190, or a substantially similar process, may be implemented by one or more computing elements of the monitoring server 160, including the analysis engine. The process 190 accepts as input image, sensor, monitoring system and/or other context data and may provide various outputs, including a determination of whether the face of a person captured in an image is concealed, an estimate of the person's malicious intent, and an action to be performed by the monitoring server 160 or other device of the monitoring system. Briefly, the process 190 may include a concealment detector 192, a mask don/doff detector 193, a malicious intent detector 194, and a decision engine 197.

In more detail, the process 190 includes a concealment detector 192 that analyzes image data 191. The image data 191 may be, for example, still or video images recorded by a camera 130 of the property 102 and sent to the monitoring server 160 by the control unit 110. Based on the image data 191, the concealment detector 192 determines whether the image data 191 includes an image of the person 170 in which the person's face should be visible. If the concealment detector 192 determines that the image data 191 does include an image where the person's face should be visible, the concealment detector 192 determines if the person's face is visible in the image or if the person's face is concealed.

For example, the concealment detector 192 may process, filter, or transform the image data 191 to evaluate whether a form present in an image is of a shape and size that could correspond to the body of the human person 170. If the form is of the appropriate shape and size to correspond to the body, the concealment detector 192 may further evaluate whether that body and head are angled such that the face of the person 170 should be visible in the image data 191.

If, based on the pose and position of the person's body, the concealment detector 192 determines that the face of the person 170 should not be visible in the image data 191 and the images were captured by a camera 130 mounted on a mobile drone, the monitoring server 160 may command the mobile drone to move about the property 102 in order to obtain a view of the person 170 in which his face should be visible.

If the concealment detector 192 determines that the face of the person 170 should be visible in the image data 191, the concealment detector 192 may then apply any of various facial detection, classification, or processing techniques to the image data to determine whether the face of the person 170 is detected. If the concealment detector 192 detects a face of the person 170, the detector 192 may annotate the image data 191 indicating that the person's face is not concealed. If the concealment detector 192 determines that the face of the person 170 face should be visible, but does not detect a face, the concealment detector 192 may determine that the face of the person 170 is concealed.

In some implementations, in addition to determining whether a face is detected, the concealment detector 192 may determine whether a mask or other disguise or concealment technique are detected in the image data 191. For example, the concealment detector 192 may determine that the person 170 in the image data 191 is wearing a ski mask, disguise, or other concealment device. In some examples, the concealment detector 192 may determine that the person 170 in the image data 191 is wearing accessories that substantially conceal his face, such as large sunglasses, or a wide-brimmed hat.

In some implementations, the concealment detector 192 may output data indicating that it detected a concealed face in the image data 191. In some cases, the concealment detector 192 may annotate the image data 191 to indicate it detected a concealed face. Two example processing methods that may be used by the concealment detector 192 are described in more detail in FIGS. 2A and 2B.

In some implementations, the process 190 also includes a mask don/doff detector 193. If the concealment detector 192 detects a concealed face, the mask don/doff detector 193 may perform further analysis to determine whether any of the images of the image data 191 capture the person 170 donning (putting on) or doffing (taking off) a mask or other disguise.

For example, the mask don/doff detector 193 may identify the image frame in which facial concealment of the person 170 is detected, then analyze multiple frames captured before, after, or before and after the identified image to determine whether the camera 130 captured an image of the person 170 donning (or doffing) a mask. In some implementations, the mask don/doff detector 193 may analyze images from other nearby cameras 130 to evaluate whether another camera 130 of the property 102 captured an image of the person 170 donning or doffing a mask. The mask don/doff detector 193 may provide an output indicating whether the image data 191 captured the don/doff event. In some implementations, the mask don/doff detector 193 may annotate one or more of the image data 191 with results of its analysis. An example processing method that may be used by the mask don/doff detector 193 is described in more detail in FIG. 3.

In some implementations, the process 190 also includes a malicious intent detector 194 to estimate the likelihood that the person 170 has a malicious, mischievous, or criminal intent. The malicious intent detector 194 may analyze any combination of various input information to evaluate the intent of the person 170. For example, the malicious intent detector 194 may analyze information output by the concealment detector 192 indicating whether the face of the person 170 is concealed. The malicious intent detector may also analyze information output by the mask don/doff detector 193 indicating whether a don/doff event was detected.

In some implementations, the malicious intent detector 194 may analyze context data 195 received as part of the sensor data sent by the control unit 110 or received from an external source (e.g., the internet, another device, etc.). The context data 195 may include, for example, the outdoor temperature or a weather report (e.g., sunny, raining, etc.) for the location of the property 102. The context data 195 may also include the date, time of day or year, or other data that provides information related to the property 102 or the person 170.

In some implementations, the malicious intent detector 194 may analyze raw or processed image data 191, for example, to extract features of the person 170, such as breathing rate or pulse, captured in video images. In some cases, the intent detector 194 may analyze image data 191 to evaluate and characterize the movement of the person 170. For example, the intent detector 194 may process the data 191 to determine that the person 170 appears to be crouching low to the ground (which may signal malicious intent) or walking upright (which may signal benign intent).

The malicious intent detector 194 analyzes the various input information to estimate the likelihood that the person 170 in the image data 191 has a malicious, mischievous, or criminal intent. For example, the malicious intent detector 194 may receive information from the concealment detector 192 indicating that the person 170 at the property 102 is likely wearing sunglasses that conceal his face, while the context data 195 indicate that the time is 11:00 PM, well after dark. Based on this information, the intent detector 194 may determine that the person 170 has a high likelihood of malicious intent, as he may be purposely obscuring his face by wearing sunglasses after dark.

As another example, the malicious intent detector 194 may receive information from the concealment detector 192 indicating that the person 170 is wearing a ski mask, data from a sensor 120 indicating that the temperature at the property 102 is 5 degrees Fahrenheit, and a weather report noting high winds in the vicinity of the property 102. Based on this information, the intent detector 194 may determine that the person 170 is less likely to have a malicious intent, as he may be wearing a ski mask to protect his face from the cold weather.

In some examples, the malicious intent detector 194 generates a malicious intent score 196, which may, for example, be a binary value that indicates whether it is likely the person 170 has an ill or malicious intent (e.g., "1"=malicious intent likely, "0"=malicious intent unlikely). In some implementations, the malicious intent score 196 may be assigned a value within a particular range or scale (e.g., a decimal value between "0" and "1" where "0" represents malicious intent is very unlikely and "1" represents malicious intent is very likely). The malicious intent detector 194 may generate the malicious intent score 194 based on a variety of inputs, including image data 191, context data 195, and inputs from the concealment detector 192 and mask don/doff detector 193.

The malicious intent detector 194 may implement any of various algorithms or techniques to estimate the likelihood of malicious intent or generate the malicious intent score 196. In some implementations, the malicious intent detector 194 may include a neural network or other machine learning model to evaluate intent. In some implementations, the intent detector 194 may include stochastic, probabilistic, parametric, or semi-parametric models and/or simulations. In some cases, the malicious intent detector 194 may determine intent based on one or more rules.

In some implementations, the malicious intent detector 194 may use different algorithms, models, or rules to determine the intent of a person 170 at different properties 102 or at different times. For example, the algorithm, model, or rule may vary with the geographic location of property 102, the season, or the weather patterns. For instance, a malicious intent detector 194 monitoring a property 102 in a warm location, such as Hawaii, may assign a higher malicious intent score 196 (i.e., more likely to be malicious) to a person 170 wearing a ski mask than would a malicious intent detector 194 monitoring a property 102 in a cold location, such as Minnesota.

The process 190 may include a decision engine 197 that, based on the malicious intent score 196 and/or other inputs, determines one or more actions 198 to be performed by the monitoring server 160 or another device of the monitoring system. For example, based on a malicious intent score 196 that indicates that the person 170 likely has malicious objectives, the decision engine 197 may determine that the monitoring server 160 should send a notification to an authorized device of the owner of the property 102. The decision engine 197 may also determine that the monitoring server 160 should command the control unit 110 to sound an alarm on the property 102, or elevate the security status (e.g., armed, disarmed) of the monitoring system. The action 198 determined by the decision engine 197 may be performed by the monitoring server 160, the control unit 110, or another device of the monitoring system.

In some implementations, the decision engine 197 may determine the action 198 based on one or more rules. For example, the decision engine 197 may access a rule that states that the monitoring server 160 should send a notification to the authorized device of the property owner whenever a person 170 wearing a mask is detected on the property 102. In some cases, the one or more rules may be set or modified the owner of the property 102 or another authorized user. For example, the property owner may modify the previous rule to state that the monitoring server 160 should only send a notification to the authorized device if the server 160 determines that the person 170 wearing a mask has a high likelihood of malicious intent, that is, a malicious intent score 196 above a particular threshold.

In stage (D), based on the analysis of the sensor, image, and other data, the monitoring server 160 or a monitoring system device may perform one or more monitoring system actions. For example, in some implementations, the monitoring server 160 may provide intent information generated by the analysis engine to the control unit 110. The intent information may include, for instance, the malicious intent score 196, outputs from the concealment detector 192 and the mask don/doff detector 193, and/or other data analyzed or generated by the monitoring server 160.

In some implementations, the monitoring server 160 may perform the action 198. For example, the monitoring server 160 may send a notification to an authorized device of the property owner alerting him that a person 170 with a concealed face is present on the property 102. In some cases, the monitoring server 160 may contact emergency, security, or police personnel.

In some implementations, the monitoring server 160 may send a command to the control unit 110 to perform the action 198. For example, the monitoring server 160 may send a command to the control unit 110 to sound an audible alarm on the property 102, turn on one or more lights on the property 102, or secure one or more doors on the property 102.

Any or all of the functions of the process 190, including, but not limited to, the concealment detector 192, the mask don/doff detector 193, the malicious intent detector 194, and the decision engine 197, may be implemented in any combination of hardware and/or software. In some implementations, the functions may be performed using artificial neural networks, including convolutional neural networks (CNN), deep neural networks (DNN), recurrent neural networks (RNN), probabilistic neural networks (PNN), long short term memory (LSTM) networks, or other network architectures. The neural networks may include feedforward or feedback information flows. In some examples, the functions may be performed using machine learning models, classifiers, or other computational modules.

In some implementation, information received or generated by the monitoring server 160 may be labeled, stored, and used for training data to train a neural network, machine learning model, or classifier. For example, the monitoring server 160 may store some or all of the image data 191 received from the control unit 110 to use as training data for the concealment detector 192, the mask don/doff detector 193, or the malicious intent detector 194. The stored image data 191 may be labeled (e.g., face concealed, face detected, sunglasses, mask, etc.) by any of various methods, including through a computer routine, by a software operator, or by prompting the property owner to verify a prediction generated by the monitoring server 160.

For example, the monitoring server 160 may send one or more frames of analyzed image data 191 to the property owner's authorized device and request that the owner confirm a prediction of the monitoring server 160 (e.g., request confirmation that the person 170 in the image is wearing a mask). The owner may send to the server 160 a response (e.g., yes, the person is wearing a mask), which the server 160 may use to label the image. The server 160 may then train one or more neural networks, models, or classifiers using the labeled image.

In some cases, the monitoring server 160 may send image data 191 for confirmation to an authorized individual other than the property owner (e.g., an authorized resident, a security guard, etc.).

Figure 2A:
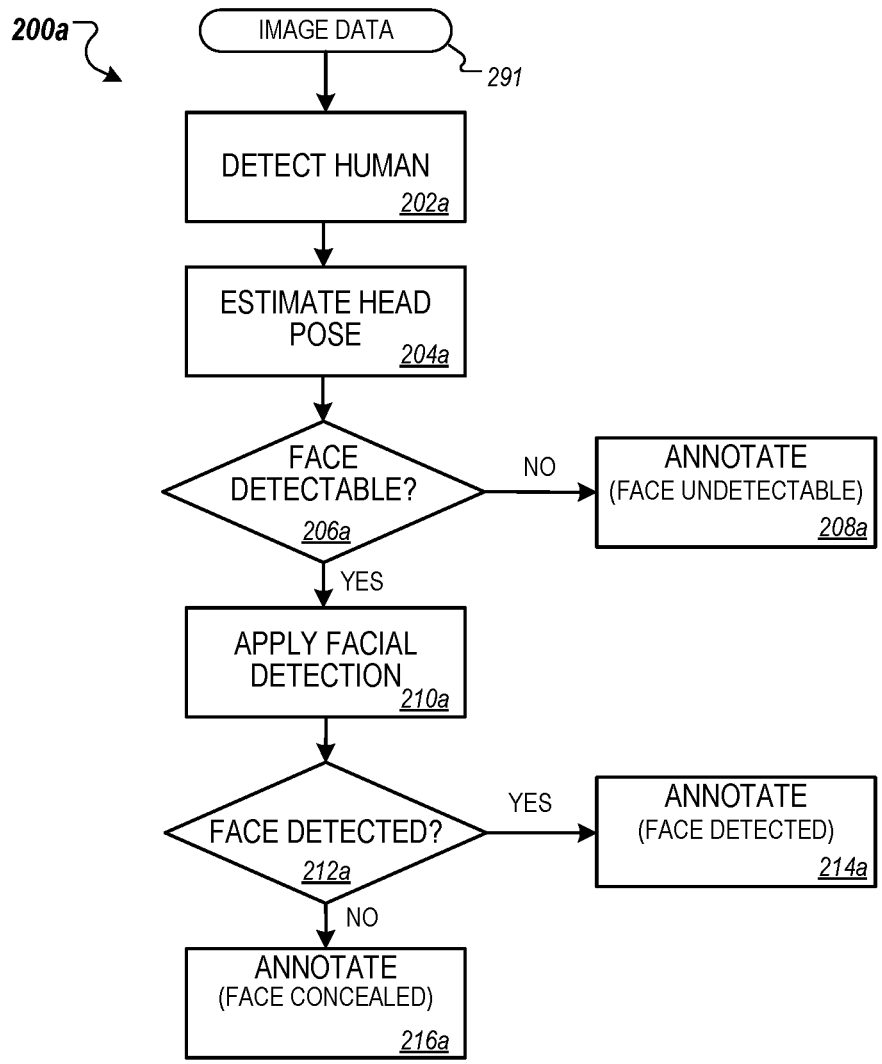
FIGS. 2A and 2B are flowcharts illustrating example methods for detecting face concealment.

FIG. 2A is a flowchart illustrating an example method 200a for detecting face concealment. The method 200a could be implemented, for instance, by the concealment detector 192 in the analysis engine of the monitoring server 160 of FIG. 1. In FIG. 2A, the method 200a implemented by the concealment detector accepts as input image data 291 from one or more cameras 130 located at the property 102 and, based on the input data, generates one or more outputs indicating whether the image data 291 includes an image of a person 170 with a concealed face. Briefly, the method 200a includes detecting a human in the image data (202a), estimating the head pose of the human (204a), determining that a human face should be detectable (206a), applying a facial detection technique to the image data (210a), and determining whether a face is detected in the image data (212a). The method 200 may then label a particular image data 291 as "face detected" or "face concealed."

In more detail, the image data 291 input to the concealment detector may consist of a single frame or sequence of frames from one or more cameras 130 on the property 102 and may be processed (e.g., filtered, truncated, transformed, etc.) or unprocessed data. In method 200a, the concealment detector analyzes the image data 291 to determine whether there is a human person in an image frame (202a). As the face of the person may be concealed, the method 200 may use techniques that do not rely on facial features (or a particular appearance of the human head) to detect a human in the image frame.

For example, the concealment detector may identify a form in a single image frame and, based on the size and shape of that form (determined, for instance, by comparing the identified form to objects of known size and shape in the image), the detector may determine that the form corresponds to a human person. In some cases, the concealment detector may analyze a sequence of frames, evaluating the movement of the identified form to determine whether it corresponds to a human person.

In some examples, the concealment detector may analyze the image data 291 to extract or super-impose a human skeleton model onto the identified form. The concealment detector may then analyze the form across a sequence of frames to determine whether the movement of the human skeleton model across the sequence matches observations or models of human movement.

In some implementations, the concealment detector may detect a human in the image data 291 by using a convolutional neural network (CNN) trained on images of human bodies. As the face of the person in the image data 291 may be concealed, the CNN may be trained on images of human bodies with the pixels associated with the human's head masked out.

If no human is detected in an image frame, the concealment detector may set aside the frame and analyze a subsequent frame for human presence.

When a human person is detected in an image, the concealment detector then estimates the head pose of the detected person (204a). For example, the concealment detector may determine that the image captured a direct frontal view, a profile view, or an askance angle view of the person's head. Estimation of the head pose includes estimating the angle of the head relative to the camera, as well as identifying the number and position of the pixels likely associated with the person's face in the image data 291.

The concealment detector may use any of various techniques to estimate the head pose of the human person detected in the image data 291. In some examples, as the face of the person may be concealed, the techniques for head pose estimation may not rely on facial features for identification.

In some implementations, the concealment detector may estimate the head pose based on the body pose of the detected human person. For example, if the image data 291 is of sufficient resolution, the detector may be able to determine the position of the shoulder, arms, and trunk of the person's body. The detector may then estimate the head to be facing a direction in an arc similar to the direction of the torso. In some cases, the concealment detector may impose a human skeletal model onto the identified body in the image data 291 to determine the most likely head pose based on the position of the skeletal model.

In some implementations, the concealment detector may estimate the head pose by evaluating a sequence of frames from the image data 291. For example, the detector may analyze a sequence of frames to determine the person's direction of movement and gait. The detector may then estimate the head pose as pointing in the direction of motion. In some examples, the concealment detector may apply a kinematic model of the moving human form across the multiple frames analyzed to improve the accuracy of the estimate.

In some cases, subtle head movements can impact the body pose, including the way the arms may swing, the size and shape of the torso, the motion of the legs. Based on analyzing the image data 291, the concealment detector may identify subtle changes in body position and from those changes, estimate a corresponding head pose.

In some implementations, the concealment detector may estimate a head pose using a convolutional neural network (CNN) trained through machine learning. Here, the CNN may be trained on images of human bodies that include a head, with the six degree of freedom head pose labeled. In some examples, using a CNN, the concealment detector may be trained to distinguish subtle head movements and position based on changes in body pose.

In some implementations, the concealment detector may repeat the analysis on additional frames or sequences of frames from the image data 291 to confirm or improve the confidence of the head pose estimate. In some examples, the detector may calculate an uncertainty of the estimated head pose. If repeated analyses of subsequent frames confirm the estimated head pose, the uncertainty in the estimate decreases. In some implementations, the detector may continue to estimate head pose from additional frames until a predetermined certainty threshold is reached or until no more suitable frames are available for analysis. Here, the number of additional frames analyzed by the detector may scale with the uncertainty in the head pose estimate (e.g., analyze fewer frames if the estimate is more certain, analyze more frames to improve the confidence if the estimate is less certain).

Based on the estimated head pose, the concealment detector determines whether the person's face should be detectable in the image data 291 (206a). Specifically, the concealment detector determines whether the estimated head pose is such that an adequate portion of the person's face is included in the image data 291 such that a subsequent facial detection algorithm could detect the face with sufficient accuracy. The entire person's face (e.g., a direct frontal view) need not be captured, but the estimated head pose must provide sufficient facial region to support detection of the face by the subsequent algorithm. The determination of face detectability may depend on the estimated head pose, as well as the quality of the image data 291, including the number of pixels associated with the face, the contrast and lighting of the image, or other image parameters.

In determining whether the person's face should be detectable in the image data 291, the concealment detector may identify various parameters related to the face in the image frame, including the predicted location of the face, the number of pixels associated with the face, the angle of the face, and the scale of the face (including the relative size, expected location of facial features, etc.).

If the concealment detector determines that the face of the person should not be detectable in the analyzed image data 291 (e.g., the person is facing substantially away from the camera, there are too few pixels associated with the facial region, the contrast or lighting of the image is too poor), the detector may annotate the frame, indicating the face is undetectable (208a). The concealment detector may then set aside the annotated frame and move on to analyze one or more other frames of the image data 291.

If the concealment detector determines that the face of the person should be detectable in the image frame, the detector may then apply a heuristic facial detection routine to the image frame to determine whether facial features are detected in the predicted facial region of the image (210a). The concealment detector may apply any of various standard or custom facial detection algorithms to the image data 291, including, for example, the Viola-Jones framework, feature detection techniques, Eigen-face-based methods, or other face detection algorithms.

Based on the results of the facial detection routine, the concealment detector determines whether a face was detected in the image data 291 (212a). The concealment detector may determine that no face is detected if, for example, it cannot identify all of the facial features expected to be visible given the estimated head pose. In some examples, the concealment detector may determine no face is detected if it cannot identify a minimum subset of facial features (e.g., it only identifies two eye when, based on the estimated head pose, it expects to identify two eyes, a nose, and a mouth). In some implementations, the concealment detector may apply more than one algorithm and determine whether a face is detected based on a composite of the results from the algorithms.

If the facial detection routine determines that a face is detected, the concealment detector may annotate the frame, indicating the result (214a).

If the facial detection routine determines that a face is not detected but should have been detectable given the estimated head pose, the concealment detector may annotate the frame indicating that the face is concealed (216a).

In some implementations, the facial detection routines may be programmed to detect not only expected facial features (e.g., eyes, nose, nostrils, mouth, eyebrows), but also common items that might obscure facial features, such as hats, scarves, hoods, eyeglasses, sunglasses, facial hair (e.g., mustache, beard), cellphones, and headphones. In this case, the concealment detector may include one or more rules to determine how to classify images (e.g., as face detected or face concealed) in which combinations of detected facial features and obscuring features are detected.

In some examples, the rules regarding obscuring features may depend on various factors in addition to the image itself, including the time of day, time of year, or temperature at the property 102. For example, the concealment detector may label an image in which the detected person is wearing sunglasses as "face concealed" if the image was captured after sunset, while it may label the image as "face detected" if the image was captured during expected daylight hours.

In some implementations, the concealment detector may repeat the analysis of facial detection on multiple frames of the image data 291 to confirm or improve the confidence of the facial concealment determination. For example, the concealment detector may repeat the facial detection analysis on multiple frames that include an image of the same detected person and, from the composite determination, calculate an uncertainty of facial detection determination. If analyses of subsequent frames reach the same facial concealment determination, the confidence in the determination increases (equivalently, the uncertainty in the determination decreases). In some implementations, the concealment detector may continue analyzing subsequent frames for facial detection until a predetermined confidence threshold is reached or until no more suitable frames are available for analysis.

Figure 2B:
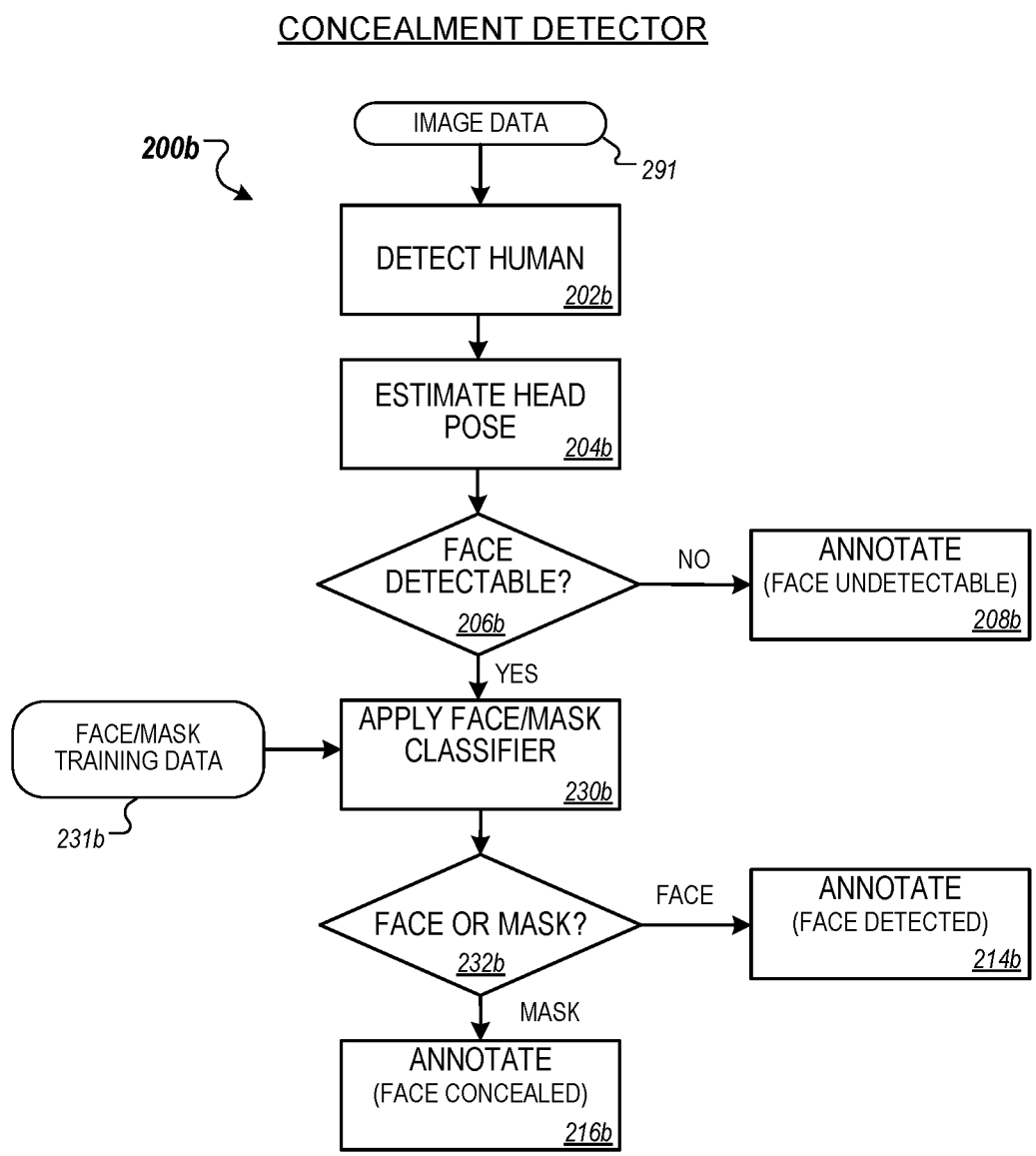

FIG. 2B is a flowchart illustrating a second example method 200b for detecting face concealment. The method 200b could, for instance, be implemented by the concealment detector 192 in the analysis engine of the monitoring server 160. Briefly, the method 200b of FIG. 2B includes detecting a human in the image data 291 (202b), estimating the head pose of the human (204b), determining that a human face should be detectable (206b), applying to the image a binary face/mask classifier (230b), and determining whether a face or a mask is detected in the image data 291 (232b). The method 200b may then label a particular image data 291 as "face detected" or "face concealed" (214b and 216b, respectively)

In method 200b, the initial steps of detecting a human in the image data 291 (202b), estimating the head pose of the human (204b), and determining that a human face should be detectable (206b) may be performed by the concealment detector as the corresponding steps 202a, 204a, and 206a, respectively, are described in method 200a. Similarly to method 200a, if the concealment detector determines that the estimated head pose is such that no face should be detectable in a particular image frame 291, the concealment detector may annotate the frame noting that the face is undetectable, set aside the frame, and analyze one or more other frames of the image data 291.

If the concealment detector determines that, based on the estimated head pose, the face of the human should be detectable in the image frame, rather than applying a facial detection routine as in method 200a, the concealment detector applies to the image a binary face/mask classifier (230b). The face/mask classifier may be, for example, a convolutional neural network (CNN), another deep neural network (DNN), or a machine-learning model, which has been trained to discriminate between masked and unmasked faces.

The face/mask classifier may be pre-trained on labeled training data 231b which contains images of human persons with both masked and unmasked faces. The training data 231b may include images of persons wearing any of various disguises, including masks, sunglasses, scarves, facial hair (e.g., mustaches, beards), hats, or other concealment devices. The training data 231b may also include images of persons with exposed, unconcealed faces. In some implementations the training data 231b may include images from standard databases such as Labeled Faces in the Wild (LFW). In some cases, the face/mask classifier may be trained periodically using updated sets of training data 231b, including training data 231b derived from images captured by cameras 130 at the property 102 monitored by the monitoring system.

The binary face/mask classifier outputs data indicating whether a face or a mask is detected on the person identified in the image data 291. In some cases, the face/mask classifier may output additional supporting information, including, for example, a confidence score associated with the face/mask determination, details regarding the determination (e.g., the face appears to be male, the mask comprises sunglasses and a scarf). In some examples, the face/mask classifier may output a bounding box defining the region of the image containing the mask, possibly with an associated confidence score.

In some implementations, the face/mask classifier may be a higher-level (e.g., ternary, quaternary, etc.) classifier able to distinguish between more than two categories. For example, the face/mask classifier may be a ternary classifier able to distinguish between exposed faces, human-like masks, and inhuman-like masks. As another example, the face/mask classifier may be a ternary classifier able to distinguish between exposed faces, masks, and other disguises (e.g., a hat and scarf).

Based on the output of the face/mask classifier, the concealment detector determines whether a face or a mask is present on the identified human in the image data 291 (232b). If the face/mask classifier indicates a face is present, the concealment detector may annotate the image data 291 indicating that the face is detected (214b). If the face/mask classifier indicates that a mask is present, the concealment detector may annotate the image data 291 indicating that the face is concealed (216b).

Similarly to method 200a, the concealment detector may repeat the face/mask classification on additional image frames to improve the confidence of the facial concealment determination.

In some implementations, compared to the heuristic facial detection routine of method 200a, the trained classifier of method 200b may provide a more accurate and robust determination of facial concealment. For example, in a facial detection algorithm may indicate whether face-like features are present in an image but, in some cases, it may not be able to distinguish a real, exposed face from an artificial face (e.g., a human-like mask). Alternatively, a classifier may be trained to discriminate more subtle facial features or liveliness indicators that enable it to better discriminate between a real face and an artificial face. Furthermore, in some cases, the trained classifier may enable facial concealment even when the face is not directed towards the camera, for example, by recognizing a mask or disguise from a side-view or profile image.

In some implementations, the concealment detector may implement one or more facial detection routines and/or trained classifiers for determining facial concealment. For example, after detecting a human in an image, estimating a head pose, and determining that a face should be detectable, the concealment detector may input the image data 291 to both a facial detection routine and a trained classifier. The concealment detector may then use ensemble-system voting to determine if the face of the person in the image data 291 is concealed.

Figure 3:
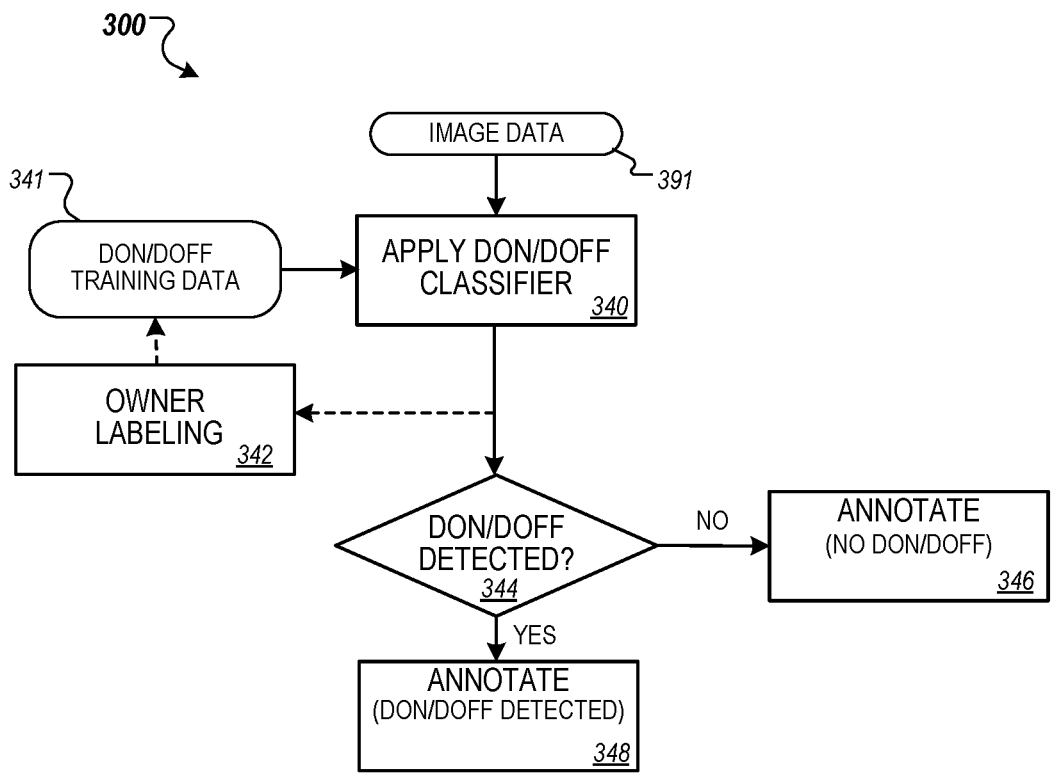
FIG. 3 is a flowchart illustrating an example method for detecting donning and/or doffing of a mask.

FIG. 3 is a flowchart illustrating an example method 300 for detecting donning and/or doffing of a mask. The method 300 could be implemented, for instance, by the mask don/doff detector 193 in the analysis engine of the monitoring server 160 of FIG. 1. In FIG. 3, the method 300 accepts as input image data 391 that includes one or more frames in which a person has a concealed face and outputs data indicating whether the image data 391 captured the person in the act of donning or doffing the mask. Briefly, the method 300 includes applying a trained don/doff classifier to the image data 391 (340), determining whether a don/doff event is captured in the image data 391 (344) and annotating the image data 391 accordingly (346 and 348).

In more detail, in the method 300, the mask don/doff detector accepts as input image data 391 that includes one or more frames in which a person in the image has been determined to have a concealed face. In some implementations, the image data 391 may be passed to the mask don/doff detector by the concealment detector, which determined that the person's face was concealed in at least one image frame.

The image data 391 also contains image frames adjacent in time (e.g., before, after, or before and after) to those frames in which facial concealment was detected. The mask don/doff detector analyzes the multiple frames of the image data 391 to determine whether the camera that acquired the image data 391 captured the person in the act of donning or doffing the concealment device.

The mask don/doff detector may determine whether a don/doff event was captured by the monitoring system cameras by applying a trained don/doff classifier to the multiple frames of the image data 391 (340). The don/doff classifier may, for example, be a convolutional neural network (CNN) classifier, another deep neural network (DNN), or other machine-learning trained system. In some examples, the don/doff classifier may be any combination of deep recursive convolutional neural networks (RCNN), attentive convolutional neural networks (ACNN), and/or long short term memory (LSTM) networks.

The don/doff classifier may determine that a don/doff event was captured in the image data 391 by any of various techniques. For example, the don/doff detector may process the image data 391 to analyze the movement and pose of the person across image frames and the don/doff classifier may compare that movement to expected or modeled motions of a human person donning or doffing a mask or disguise. In some examples, the don/doff detector may process the image data 391 to impose a human skeletal model onto the person in the image frames to evaluate whether the person's activity corresponds to a modeled or observed don/doff event.

In some implementations, the don/doff classifier may include a frame relevance gauging mechanism, such as a deep temporal attention-based recurrent neural network (RNN). The RNN may assign a relevance weight to each of the frames of the image data 391 to emphasize a subset of frames for further analysis. The weighted frames from the image data 391 can then be analyzed by a subsequent appearance-based CNN, which may determine whether the subset of frames contains a don/doff event.

In some implementations, the don/doff classifier may be pre-trained using don/doff training data 341. The training data 341 may include, for example, labeled video or image data that depicts various persons engaging in don/doff actions, such as putting on a ski mask, taking off a hat, tying on a handkerchief, or wrapping a face in a scarf. The training data 341 may also include labeled videos or images of persons engaging in benign (e.g., not mask donning or doffing) activities. In some examples, the training data 341 may include processed video or image data, such as data indicating various human poses typically associated with don or doff actions.

In some implementations, the don/doff classifier may detect a don/doff event that happened outside the field of view of the camera by linking sightings of the person captured by a camera at different times, where the person's face is concealed in at least one sighting and masked in at least one sighting. For example, the don/doff classifier may use the general appearance of the person (e.g., estimated height and weight, clothing, gait, etc.) to determine that the person with concealed face in one frame is the same as the person with unmasked face in another frame captured at a different time. In this case, the don/doff classifier may infer that the person donned or doffed the mask in the time interval between the two frames. In some cases, rather than relying solely on the general appearance of the person to link sightings in different frames, the don/doff detector may use a parametric model of the person to verify the person's identity in the different frames. In some examples, the parametric model of the person may include soft biometric traits including skin, eye, or hair color; height; weight; clothing, accessories; gait; or other features that identify the person.

In some implementations, the don/doff classifier may analyze image data 391 captured by different cameras on the property to determine that a don/doff event was captured. For example, the don/doff classifier may use the general appearance of the person to determine that the person with concealed face in a frame captured by one camera is the same as the person with an unmasked face in a frame captured by a different camera. Such a situation may occur, for instance, if the person enters the first camera field of view wearing a mask, exits the field of view of the first camera, takes off his mask, then enters the field of view of the second camera unmasked.

Evaluating image data 391 from multiple cameras located at the property enables the mask don/doff detector to take advantage of the spatial and temporal relationships between the multiple cameras (e.g., cross-camera tracking). In some implementations, the relative locations and properties of the multiple cameras may be calibrated, allowing more accurate determination of the time, location, or other characteristics related to the don/doff event.

Based on the output of the don/doff classifier, the don/doff detector determines whether donning or doffing of the mask was detected in the image data 391 (344). If no don/doff event is detected, the don/doff detector may annotate the image data 391 accordingly (346). Alternatively, if a don/doff event is detected by the don/doff classifier, the don/doff detector may annotate the image data 391 indicating the don/doff detection (348), where that annotation may include bookmarking the frame or frames containing the don/doff event.

Additionally, if the mask don/doff detector detects that the image data 391 include a don/doff event, the detector may further label or tag the frames in which the person's facial features are visible. The monitoring server may then make those frames available to facial recognition software or to law enforcement authorities to enable identification of the masked individual.

In some implementations, the don/doff classifier may be retrained while deployed. In this case, the training data 341 may include data analyzed by the don/doff classifier and labeled by a property owner (342). For instance, the monitoring server may send one or more frames of image data 391 to an authorized device of the property owner and request the owner to confirm that frames include a don/doff event. As one example, the monitoring server may send a sequence of frames and ask the owner to confirm that the person in the frames is putting on sunglasses. As another example, the monitoring server may send two image frames to the owner, one in which the person's face is concealed and another in which the person's face is exposed, and ask the owner to confirm that the image frames depict the same person. Based on the response from the owner, the monitoring server may apply a label to the image data 391 and use that image data 391 in subsequent training of the don/doff classifier.

Figure 4:
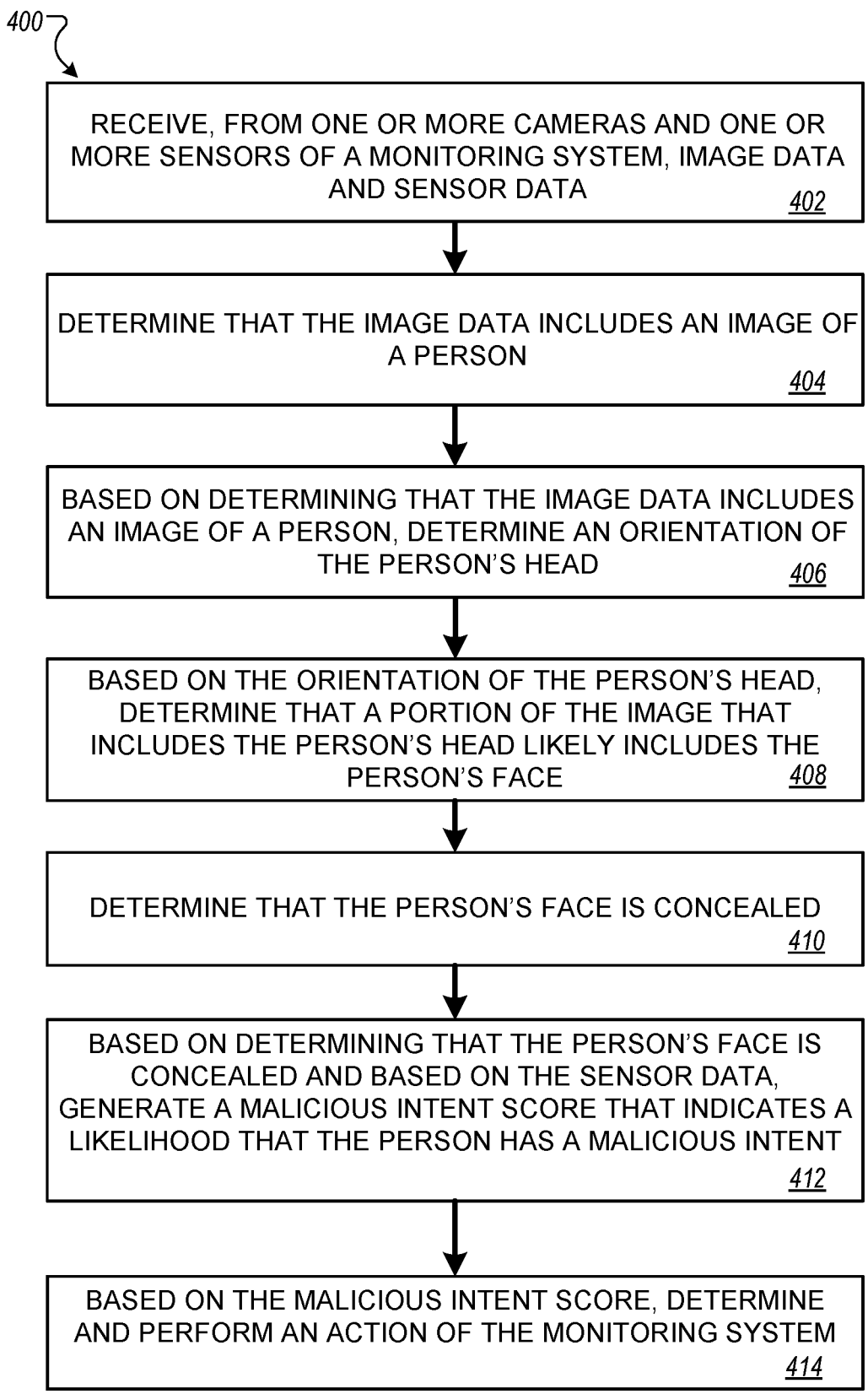
FIG. 4 is a flowchart illustrating an example process for detecting face concealment and malicious intent.

FIG. 4 is a flowchart illustrating an example process 400 for detecting facial concealment and malicious intent. Briefly, process 400 includes receiving, from one or more cameras and one or more sensors of a monitoring system, image data and sensor data (402); determining that the image data includes an image of a person (404); based on determining that the image data includes an image of a person, determining an orientation of the person's head (406); based on the orientation of the person's head, determining that a portion of the image that includes the person's head likely includes the person's face (408); determining that the person's face is concealed (410); based on determining that the person's face is concealed and based on the sensor data, generating a malicious intent score that indicates a likelihood that the person has a malicious intent (412); and, based on the malicious intent score, determining and performing an action of the monitoring system (414). The process 400 may be implemented by one or more computer systems, for example, a monitoring server 160 that is part of a security monitoring system. The operations of process 400 may be implemented in any combination of hardware and/or software. Some or all of the operations of process 400 may be implemented using machine learning models and techniques, or any of various neural network computing architectures.

In more detail, in the process 400, a computer system receives, from one or more cameras and one or more sensors of a monitoring system, image data and sensor data (402). The image data may include still or video images, multicolor or monochrome images, 2D or 2D plus depth images. The image data may be captured by any camera technology, including those detecting visible light, IR energy, millimeter waves, or other radiation. The sensor data may be acquired by any of various sensors of a monitoring system, including, but not limited to, motion detectors, temperature sensors, and weather monitors.

After receiving the image data and sensor data, the computer system determines that the image data includes an image of a person (404). The computer system may detect a person in the image data by any of various techniques. For example, the system may identify a form in the image data and determine that the form corresponds to the size and shape of a typical human person. The system may analyze a sequence of image data frames to determine that the motion of a particular identified form corresponds to the modeled or observed movement of a human person. In some implementations, the system may impose a human skeletal model onto the image data and use a kinematic model to determine that the position or motion of a form in the image data corresponds to an expected position or motion of a human person.

Based on determining that the image data includes an image of a person, the computer system determines an orientation of the person's head (406). Determining the orientation of the person's head may include estimating the position of the head, the angle of head relative to the camera, the number and location of the pixels associated with the person's head in the image data.

The system may use any of various to determine the orientation of the person's head. For example, the system may determine the head orientation based on the pose of the person's body in the image data, for instance, by imposing a human skeletal model onto person in the image data. In some implementations, the system may determine the head orientation by analyzing the movement of the person across multiple image data frames and use the detected motion (e.g., direction of movement, gait, change in body position, motion of arms, etc.) to determine a likely orientation of the person's head.

Based on the determined orientation of the person's head, the computer system implementing process 400 may determine that a portion of the image that includes the person's head likely includes the person's face (408). In particular, the system may determine that the head orientation is such that, if the face is not concealed, the image data should contain a sufficient portion of the person's facial region to enable facial recognition by subsequent software routines. In some implementations, the extent of the facial region required for facial recognition may vary based on the facial recognition routine implemented.

If the computer system determines that the portion of the image data that includes the person's head likely includes the person's face, the computer system may then determine, by any of various methods, that the person's face is concealed (410). For example, the system may apply a facial recognition routine to the portion of the image data that likely includes the person's face. If the facial recognition routine does not identify a face, the system may determine that the person's face is concealed. As another example, the system may apply a face/mask classifier to the image data, where the face/mask classifier has been trained to discriminate between an exposed human face and a human face covered by mask or other disguise. If the face/mask classifier determines that the face of the image data is covered by a mask or other disguise, the system may determine that the person's face is concealed.

Based on determining that the person's face is concealed and based on the sensor data, the computer system may generate a malicious intent score that indicates a likelihood that the person has a malicious intent (412). The malicious intent score may be, for example, a numeric value within a range from a low value indicating benign intent to a high value indicating malicious intent. In some cases, the malicious intent score may take on a binary value (e.g., "0" for benign intent, "1" for malicious intent).

For example, based on determining that the person's face is concealed in the image data and temperature sensor data indicating that the outdoor temperature at the time the image was captured was 5 degrees Fahrenheit, the system may determine that the person likely is concealing his face to protect against the weather and generate a malicious intent score indicating benign intent (e.g., "0"). Alternatively, if the temperature sensor indicates that the outdoor temperature at the time the image was captured was 75 degrees Fahrenheit, the system may determine that the person may be concealing his face to hide his identity and generate a malicious intent score indicating malicious intent (e.g., "1").

Based on the malicious intent score, the computer system may determine and perform an action of the monitoring system (414). For example, if the determined malicious intent score is above a certain threshold, indicating a high likelihood of malicious intent, the system may send a notification to an authorized device of the property owner, alert emergency personnel (e.g., the police), trigger recording of one or more cameras on the property, or sound an audible alarm on the property.

In some implementations, the systems described in this application can be used to detect when a person may be covering the person's face with the person's hands, arms, and/or another object. When the system determines a likely pose of the person, the system may determine where the person's head is with respect to the arms. If the arms are located where the head is expected to be or near the head, then the system may determine that the person is covering the person's head with the person's hands, arms, and/or another object. In this case, the system may treat the person's covered head the same way as if the person were wearing a mask. The system may use a model trained on labeled images and videos of people covering their heads with their hands, arms, and/or another object and of people not covering their heads with their hands, arms, and/or another object. Alternatively, or additionally, the system may use rules to determine when a person may be covering their heads with their hands, arms, and/or another object. The rules may include hands being within a certain distance of an expected face and/or no face visible for a certain amount of time.

In some implementations, the system may use additional factors to determine whether a person has malicious intent. The system may determine vital statistics of a person in the image. The system may apply a model trained on labeled images and videos of people. The labels may indicate the heart rate, respiration rate, and other vital statistics. The system may also use rules to measure any detected pulsing blood vessels in a person's neck region and measure an expansion rate of a person's chest. In colder weather, the system may also detect vapor from a person's breath and use that to determine a respiration rate. A higher respiration rate or pulse may indicate a higher likelihood of malicious intent.

In some implementations, the system may adjust any thresholds used for any processing described above according to the armed status of the property. For a property that is armed away, the system may use a higher threshold that if the system armed stay. The armed stay threshold may be higher than an unarmed threshold. In some implementations, the thresholds may be the same for each armed status. In some implementations, the system may adjust the armed status if the malicious intent score is above a threshold. For example, if the malicious intent score is 0.7 and is above a threshold of 0.6, then the system may increase the armed status to the next level (e.g., unarmed to armed stay or armed stay to armed away). The system may also notify monitoring systems of nearby properties to increase the armed status of the nearby properties' systems.

Figure 5:
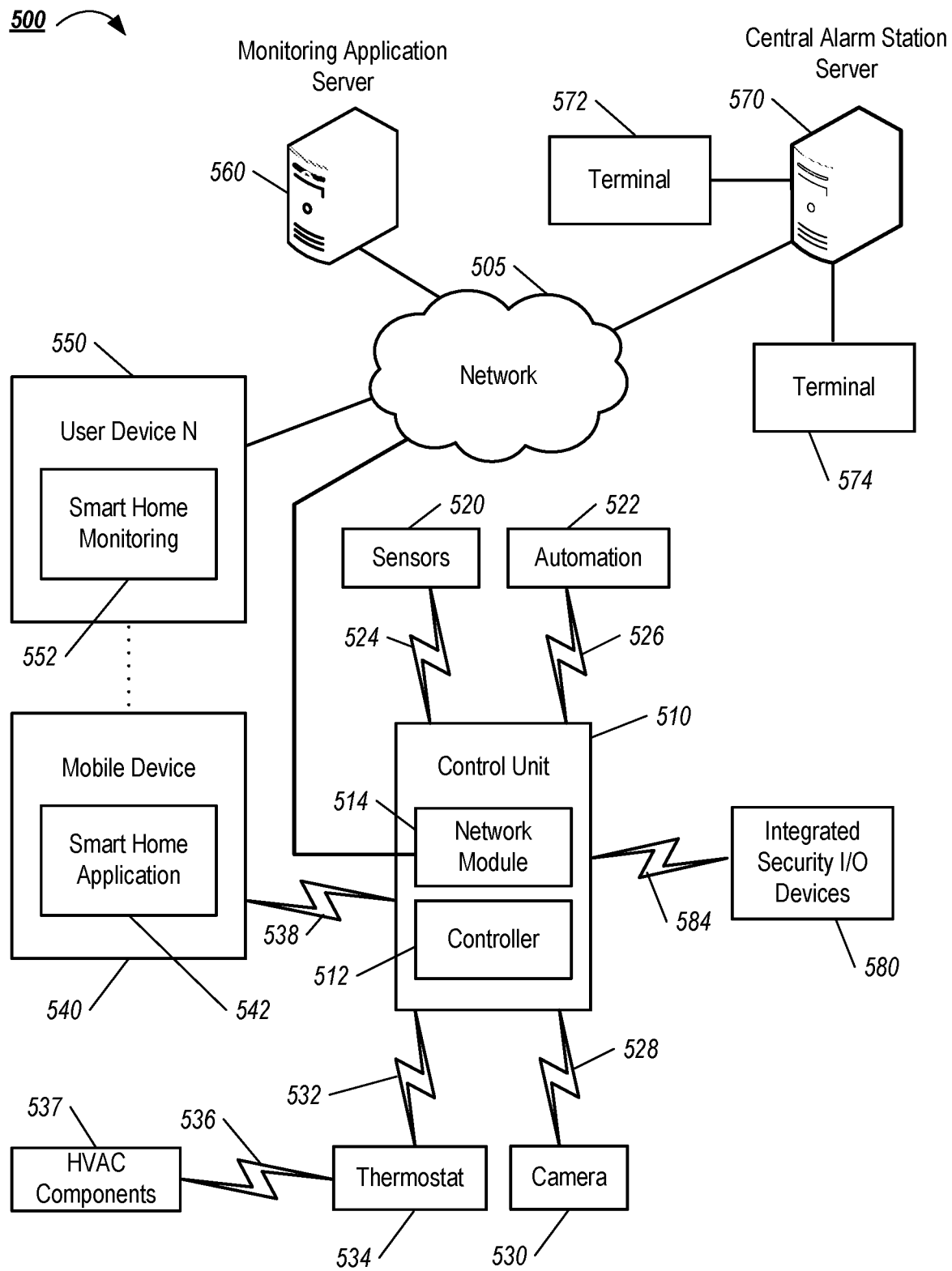
FIG. 5 is a block diagram illustrating an example security monitoring system.

FIG. 5 is a block diagram of an example security monitoring system 500. The electronic system 500 includes a network 505, a control unit 510, one or more user devices 540 and 550, a monitoring server 560, and a central alarm station server 570. In some examples, the network 505 facilitates communications between the control unit 510, the one or more user devices 540 and 550, the monitoring server 560, and the central alarm station server 570.

The network 505 is configured to enable exchange of electronic communications between devices connected to the network 505. For example, the network 505 may be configured to enable exchange of electronic communications between the control unit 510, the one or more user devices 540 and 550, the monitoring server 560, and the central alarm station server 570. The network 505 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 505 may include multiple networks or subnetworks, each of which may include, for example, a wired or wireless data pathway. The network 505 may include a circuit-switched network, a packet-switched data network, or any other network able to carry electronic communications (e.g., data or voice communications). For example, the network 505 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 505 may include one or more networks that include wireless data channels and wireless voice channels. The network 505 may be a wireless network, a broadband network, or a combination of networks including a wireless network and a broadband network.

The control unit 510 includes a controller 512 and a network module 514. The controller 512 is configured to control a control unit monitoring system (e.g., a control unit system) that includes the control unit 510. In some examples, the controller 512 may include a processor or other control circuitry configured to execute instructions of a program that controls operation of a control unit system. In these examples, the controller 512 may be configured to receive input from sensors, flow meters, or other devices included in the control unit system and control operations of devices included in the household (e.g., speakers, lights, doors, etc.). For example, the controller 512 may be configured to control operation of the network module 514 included in the control unit 510.

The network module 514 is a communication device configured to exchange communications over the network 505. The network module 514 may be a wireless communication module configured to exchange wireless communications over the network 505. For example, the network module 514 may be a wireless communication device configured to exchange communications over a wireless data channel and a wireless voice channel. In this example, the network module 514 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 514 also may be a wired communication module configured to exchange communications over the network 505 using a wired connection. For instance, the network module 514 may be a modem, a network interface card, or another type of network interface device. The network module 514 may be an Ethernet network card configured to enable the control unit 510 to communicate over a local area network and/or the Internet. The network module 514 also may be a voice band modem configured to enable the alarm panel to communicate over the telephone lines of Plain Old Telephone Systems (POTS).

The control unit system that includes the control unit 510 includes one or more sensors. For example, the monitoring system may include multiple sensors 520. The sensors 520 may include a lock sensor, a contact sensor, a motion sensor, or any other type of sensor included in a control unit system. The sensors 520 also may include an environmental sensor, such as a temperature sensor, a water sensor, a rain sensor, a wind sensor, a light sensor, a smoke detector, a carbon monoxide detector, an air quality sensor, etc. The sensors 520 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 520 may include a radio-frequency identification (RFID) sensor that identifies a particular article that includes a pre-assigned RFID tag.

The control unit 510 communicates with the module 522 and the camera 530 to perform monitoring. The module 522 is connected to one or more devices that enable home automation control. For instance, the module 522 may be connected to one or more lighting systems and may be configured to control operation of the one or more lighting systems. Also, the module 522 may be connected to one or more electronic locks at the property and may be configured to control operation of the one or more electronic locks (e.g., control Z-Wave locks using wireless communications in the Z-Wave protocol. Further, the module 522 may be connected to one or more appliances at the property and may be configured to control operation of the one or more appliances. The module 522 may include multiple modules that are each specific to the type of device being controlled in an automated manner. The module 522 may control the one or more devices based on commands received from the control unit 510. For instance, the module 522 may cause a lighting system to illuminate an area to provide a better image of the area when captured by a camera 530.

The camera 530 may be a video/photographic camera or other type of optical sensing device configured to capture images. For instance, the camera 530 may be configured to capture images of an area within a building or within a residential facility monitored by the control unit 510. The camera 530 may be configured to capture single, static images of the area and also video images of the area in which multiple images of the area are captured at a relatively high frequency (e.g., thirty images per second). The camera 530 may be controlled based on commands received from the control unit 510.

The camera 530 may be triggered by several different types of techniques. For instance, a Passive Infra-Red (PIR) motion sensor may be built into the camera 530 and used to trigger the camera 530 to capture one or more images when motion is detected. The camera 530 also may include a microwave motion sensor built into the camera and used to trigger the camera 530 to capture one or more images when motion is detected. The camera 530 may have a "normally open" or "normally closed" digital input that can trigger capture of one or more images when external sensors (e.g., the sensors 520, PIR, door/window, etc.) detect motion or other events. In some implementations, the camera 530 receives a command to capture an image when external devices detect motion or another potential alarm event. The camera 530 may receive the command from the controller 512 or directly from one of the sensors 520.

In some examples, the camera 530 triggers integrated or external illuminators (e.g., Infra-Red, Z-wave controlled "white" lights, lights controlled by the module 522, etc.) to improve image quality when the scene is dark. An integrated or separate light sensor may be used to determine if illumination is desired and may result in increased image quality.

The camera 530 may be programmed with any combination of time/day schedules, system "arming state", or other variables to determine whether images should be captured or not when triggers occur. The camera 530 may enter a low-power mode when not capturing images. In this case, the camera 530 may wake periodically to check for inbound messages from the controller 512. The camera 530 may be powered by internal, replaceable batteries if located remotely from the control unit 510. The camera 530 may employ a small solar cell to recharge the battery when light is available. Alternatively, the camera 530 may be powered by the controller's 512 power supply if the camera 530 is co-located with the controller 512.

In some implementations, the camera 530 communicates directly with the monitoring server 560 over the Internet. In these implementations, image data captured by the camera 530 does not pass through the control unit 510 and the camera 530 receives commands related to operation from the monitoring server 560. In some implementations, the monitoring server 560 may implement face concealment detection, mask don/doff detection, and malicious intent determination based on data received directly from the camera 530.

The system 500 also includes thermostat 534 to perform dynamic environmental control at the property. The thermostat 534 is configured to monitor temperature and/or energy consumption of an HVAC system associated with the thermostat 534, and is further configured to provide control of environmental (e.g., temperature) settings. In some implementations, the thermostat 534 can additionally or alternatively receive data relating to activity at a property and/or environmental data at a property, e.g., at various locations indoors and outdoors at the property. The thermostat 534 can directly measure energy consumption of the HVAC system associated with the thermostat, or can estimate energy consumption of the HVAC system associated with the thermostat 534, for example, based on detected usage of one or more components of the HVAC system associated with the thermostat 534. The thermostat 534 can communicate temperature and/or energy monitoring information to or from the control unit 510 and can control the environmental (e.g., temperature) settings based on commands received from the control unit 510.

In some implementations, the thermostat 534 is a dynamically programmable thermostat and can be integrated with the control unit 510. For example, the dynamically programmable thermostat 534 can include the control unit 510, e.g., as an internal component to the dynamically programmable thermostat 534. In addition, the control unit 510 can be a gateway device that communicates with the dynamically programmable thermostat 534.

A module 537 is connected to one or more components of an HVAC system associated with a property, and is configured to control operation of the one or more components of the HVAC system. In some implementations, the module 537 is also configured to monitor energy consumption of the HVAC system components, for example, by directly measuring the energy consumption of the HVAC system components or by estimating the energy usage of the one or more HVAC system components based on detecting usage of components of the HVAC system. The module 537 can communicate energy monitoring information and the state of the HVAC system components to the thermostat 534 and can control the one or more components of the HVAC system based on commands received from the thermostat 534.

In some examples, the system 500 further includes one or more robotic devices. The robotic devices may be any type of robots that are capable of moving and taking actions that assist in security monitoring. For example, the robotic devices may include drones that are capable of moving throughout a property based on automated control technology and/or user input control provided by a user. In this example, the drones may be able to fly, roll, walk, or otherwise move about the property. The drones may include helicopter type devices (e.g., quad copters), rolling helicopter type devices (e.g., roller copter devices that can fly and also roll along the ground, walls, or ceiling) and land vehicle type devices (e.g., automated cars that drive around a property). In some cases, the robotic devices may be robotic devices that are intended for other purposes and merely associated with the system 500 for use in appropriate circumstances. For instance, a robotic vacuum cleaner device may be associated with the monitoring system 500 as one of the robotic devices and may be controlled to take action responsive to monitoring system events.

In some examples, the robotic devices automatically navigate within a property. In these examples, the robotic devices include sensors and control processors that guide movement of the robotic devices within the property. For instance, the robotic devices may navigate within the property using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices may include control processors that process output from the various sensors and control the robotic devices to move along a path that reaches the desired destination and avoids obstacles. In this regard, the control processors detect walls or other obstacles in the property and guide movement of the robotic devices in a manner that avoids the walls and other obstacles.

In addition, the robotic devices may store data that describes attributes of the property. For instance, the robotic devices may store a floorplan and/or a three-dimensional model of the property that enables the robotic devices to navigate the property. During initial configuration, the robotic devices may receive the data describing attributes of the property, determine a frame of reference to the data (e.g., a home or reference location in the property), and navigate the property based on the frame of reference and the data describing attributes of the property. Further, initial configuration of the robotic devices also may include learning of one or more navigation patterns in which a user provides input to control the robotic devices to perform a specific navigation action (e.g., fly to an upstairs bedroom and spin around while capturing video and then return to a home charging base). In this regard, the robotic devices may learn and store the navigation patterns such that the robotic devices may automatically repeat the specific navigation actions upon a later request.

In some examples, the robotic devices may include data capture and recording devices. In these examples, the robotic devices may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the property and users in the property. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices to take and store a biometric sample that can be used to identify the person (e.g., a biometric sample with DNA that can be used for DNA testing).

In some implementations, the robotic devices may include output devices. In these implementations, the robotic devices may include one or more displays, one or more speakers, and/or any type of output devices that allow the robotic devices to communicate information to a nearby user.

The robotic devices also may include a communication module that enables the robotic devices to communicate with the control unit 510, each other, and/or other devices. The communication module may be a wireless communication module that allows the robotic devices to communicate wirelessly. For instance, the communication module may be a Wi-Fi module that enables the robotic devices to communicate over a local wireless network at the property. The communication module further may be a 900 MHz wireless communication module that enables the robotic devices to communicate directly with the control unit 510. Other types of short-range wireless communication protocols, such as Bluetooth, Bluetooth LE, Zwave, Zigbee, etc., may be used to allow the robotic devices to communicate with other devices in the property.

The robotic devices further may include processor and storage capabilities. The robotic devices may include any suitable processing devices that enable the robotic devices to operate applications and perform the actions described throughout this disclosure. In addition, the robotic devices may include solid state electronic storage that enables the robotic devices to store applications, configuration data, collected sensor data, and/or any other type of information available to the robotic devices.

The robotic devices are associated with one or more charging stations. The charging stations may be located at predefined home base or reference locations in the property. The robotic devices may be configured to navigate to the charging stations after completion of tasks needed to be performed for the monitoring system 500. For instance, after completion of a monitoring operation or upon instruction by the control unit 510, the robotic devices may be configured to automatically fly to and land on one of the charging stations. In this regard, the robotic devices may automatically maintain a fully charged battery in a state in which the robotic devices are ready for use by the monitoring system 500.

The charging stations may be contact based charging stations and/or wireless charging stations. For contact based charging stations, the robotic devices may have readily accessible points of contact that the robotic devices are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices may charge through a wireless exchange of power. In these cases, the robotic devices need only locate themselves closely enough to the wireless charging stations for the wireless exchange of power to occur. In this regard, the positioning needed to land at a predefined home base or reference location in the property may be less precise than with a contact based charging station. Based on the robotic devices landing at a wireless charging station, the wireless charging station outputs a wireless signal that the robotic devices receive and convert to a power signal that charges a battery maintained on the robotic devices.

In some implementations, each of the robotic devices has a corresponding and assigned charging station such that the number of robotic devices equals the number of charging stations. In these implementations, the robotic devices always navigate to the specific charging station assigned to that robotic device. For instance, a first robotic device may always use a first charging station and a second robotic device may always use a second charging station.

In some examples, the robotic devices may share charging stations. For instance, the robotic devices may use one or more community charging stations that are capable of charging multiple robotic devices. The community charging station may be configured to charge multiple robotic devices in parallel. The community charging station may be configured to charge multiple robotic devices in serial such that the multiple robotic devices take turns charging and, when fully charged, return to a predefined home base or reference location in the property that is not associated with a charger. The number of community charging stations may be less than the number of robotic devices.

Also, the charging stations may not be assigned to specific robotic devices and may be capable of charging any of the robotic devices. In this regard, the robotic devices may use any suitable, unoccupied charging station when not in use.

For instance, when one of the robotic devices has completed an operation or is in need of battery charge, the control unit 510 references a stored table of the occupancy status of each charging station and instructs the robotic device to navigate to the nearest charging station that is unoccupied.

The system 500 further includes one or more integrated security devices 580. The one or more integrated security devices may include any type of device used to provide alerts based on received sensor data. For instance, the one or more control units 510 may provide one or more alerts to the one or more integrated security input/output devices. Additionally, the one or more control units 510 may receive one or more sensor data from the sensors 520 and determine whether to provide an alert to the one or more integrated security input/output devices 580.

The sensors 520, the module 522, the camera 530, the thermostat 534, and the integrated security devices 580 communicate with the controller 512 over communication links 524, 526, 528, 532, 584, and 586. The communication links 524, 526, 528, 532, 584, and 586 may be a wired or wireless data pathway configured to transmit signals from the sensors 520, the module 522, the camera 530, the thermostat 534, and the integrated security devices 580 to the controller 512. The sensors 520, the module 522, the camera 530, the thermostat 534, and the integrated security devices 580 may continuously transmit sensed values to the controller 512, periodically transmit sensed values to the controller 512, or transmit sensed values to the controller 512 in response to a change in a sensed value.

The communication links 524, 526, 528, 532, 584, and 586 may include a local network. The sensors 520, the module 522, the camera 530, the thermostat 534, and the integrated security devices 580, and the controller 512 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 5 (CAT6) wired Ethernet network. The local network may be a mesh network constructed based on the devices connected to the mesh network.

The monitoring server 560 is an electronic device configured to provide monitoring services by exchanging electronic communications with the control unit 510, the one or more user devices 540 and 550, and the central alarm station server 570 over the network 505. For example, the monitoring server 560 may be configured to monitor events (e.g., alarm events) generated by the control unit 510. In this example, the monitoring server 560 may exchange electronic communications with the network module 514 included in the control unit 510 to receive information regarding events (e.g., alerts) detected by the control unit 510. The monitoring server 560 also may receive information regarding events (e.g., alerts) from the one or more user devices 540 and 550.

In some examples, the monitoring server 560 may route alert data received from the network module 514 or the one or more user devices 540 and 550 to the central alarm station server 570. For example, the monitoring server 560 may transmit the alert data to the central alarm station server 570 over the network 505.

The monitoring server 560 may store sensor and image data received from the monitoring system and perform analysis of sensor and image data received from the monitoring system. Based on the analysis, the monitoring server 560 may communicate with and control aspects of the control unit 510 or the one or more user devices 540 and 550.

For example, the monitoring server 560 may analyze sensor and image data received from the control unit 510, the sensors 520, or the cameras 530 to detect facial concealment of a person at the property. In some implementations, the monitoring server 560 may further analyze the data to detect a mask don/doff event by the person, generate a malicious intent score related to the person, and determine an action to be performed by the monitoring system in response to the analysis. In some examples, a computer system of the control unit 510 may perform the described analyses and action determination.

The central alarm station server 570 is an electronic device configured to provide alarm monitoring service by exchanging communications with the control unit 510, the one or more mobile devices 540 and 550, and the monitoring server 560 over the network 505. For example, the central alarm station server 570 may be configured to monitor alerting events generated by the control unit 510. In this example, the central alarm station server 570 may exchange communications with the network module 514 included in the control unit 510 to receive information regarding alerting events detected by the control unit 510. The central alarm station server 570 also may receive information regarding alerting events from the one or more mobile devices 540 and 550 and/or the monitoring server 560.

The central alarm station server 570 is connected to multiple terminals 572 and 574. The terminals 572 and 574 may be used by operators to process alerting events. For example, the central alarm station server 570 may route alerting data to the terminals 572 and 574 to enable an operator to process the alerting data. The terminals 572 and 574 may include general-purpose computers (e.g., desktop personal computers, workstations, or laptop computers) that are configured to receive alerting data from a server in the central alarm station server 570 and render a display of information based on the alerting data. For instance, the controller 512 may control the network module 514 to transmit, to the central alarm station server 570, alerting data indicating that a sensor 520 detected motion from a motion sensor via the sensors 520. The central alarm station server 570 may receive the alerting data and route the alerting data to the terminal 572 for processing by an operator associated with the terminal 572. The terminal 572 may render a display to the operator that includes information associated with the alerting event (e.g., the lock sensor data, the motion sensor data, the contact sensor data, etc.) and the operator may handle the alerting event based on the displayed information.

In some implementations, the terminals 572 and 574 may be mobile devices or devices designed for a specific function. Although FIG. 5 illustrates two terminals for brevity, actual implementations may include more (and, perhaps, many more) terminals.

The one or more user devices 540 and 550 are devices that host and display user interfaces. For instance, the user device 540 is a mobile device that hosts one or more native applications (e.g., the smart home application 542). The user device 540 may be a cellular phone or a non-cellular locally networked device with a display. The user device 540 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 540 may perform functions unrelated to the monitoring system, such as placing personal telephone calls, playing music, playing video, displaying pictures, browsing the Internet, maintaining an electronic calendar, etc.

The user device 540 includes a smart home application 542. The smart home application 542 refers to a software/firmware program running on the corresponding mobile device that enables the user interface and features described throughout. The user device 540 may load or install the smart home application 542 based on data received over a network or data received from local media. The smart home application 542 runs on mobile devices platforms, such as iPhone, iPod touch, Blackberry, Google Android, Windows Mobile, etc. The smart home application 542 enables the user device 540 to receive and process image and sensor data from the monitoring system.

The user device 550 may be a general-purpose computer (e.g., a desktop personal computer, a workstation, or a laptop computer) that is configured to communicate with the monitoring server 560 and/or the control unit 510 over the network 505. The user device 550 may be configured to display a smart home user interface 552 that is generated by the user device 550 or generated by the monitoring server 560. For example, the user device 550 may be configured to display a user interface (e.g., a web page) provided by the monitoring server 560 that enables a user to perceive images captured by the camera 530 and/or reports related to the monitoring system. Although FIG. 5 illustrates two user devices for brevity, actual implementations may include more (and, perhaps, many more) or fewer user devices.

In some implementations, the one or more user devices 540 and 550 communicate with and receive monitoring system data from the control unit 510 using the communication link 538. For instance, the one or more user devices 540 and 550 may communicate with the control unit 510 using various local wireless protocols such as Wi-Fi, Bluetooth, Zwave, Zigbee, HomePlug (ethernet over power line), or wired protocols such as Ethernet and USB, to connect the one or more user devices 540 and 550 to local security and automation equipment. The one or more user devices 540 and 550 may connect locally to the monitoring system and its sensors and other devices. The local connection may improve the speed of status and control communications because communicating through the network 505 with a remote server (e.g., the monitoring server 560) may be significantly slower.

Although the one or more user devices 540 and 550 are shown as communicating with the control unit 510, the one or more user devices 540 and 550 may communicate directly with the sensors and other devices controlled by the control unit 510. In some implementations, the one or more user devices 540 and 550 replace the control unit 510 and perform the functions of the control unit 510 for local monitoring and long range/offsite communication.

In other implementations, the one or more user devices 540 and 550 receive monitoring system data captured by the control unit 510 through the network 505. The one or more user devices 540, 550 may receive the data from the control unit 510 through the network 505 or the monitoring server 560 may relay data received from the control unit 510 to the one or more user devices 540 and 550 through the network 505. In this regard, the monitoring server 560 may facilitate communication between the one or more user devices 540 and 550 and the monitoring system.

In some implementations, the one or more user devices 540 and 550 may be configured to switch whether the one or more user devices 540 and 550 communicate with the control unit 510 directly (e.g., through link 538) or through the monitoring server 560 (e.g., through network 505) based on a location of the one or more user devices 540 and 550. For instance, when the one or more user devices 540 and 550 are located close to the control unit 510 and in range to communicate directly with the control unit 510, the one or more user devices 540 and 550 use direct communication. When the one or more user devices 540 and 550 are located far from the control unit 510 and not in range to communicate directly with the control unit 510, the one or more user devices 540 and 550 use communication through the monitoring server 560.

Although the one or more user devices 540 and 550 are shown as being connected to the network 505, in some implementations, the one or more user devices 540 and 550 are not connected to the network 505. In these implementations, the one or more user devices 540 and 550 communicate directly with one or more of the monitoring system components and no network (e.g., Internet) connection or reliance on remote servers is needed.

In some implementations, the one or more user devices 540 and 550 are used in conjunction with only local sensors and/or local devices in a house. In these implementations, the system 500 only includes the one or more user devices 540 and 550, the sensors 520, the module 522, the camera 530, and the robotic devices. The one or more user devices 540 and 550 receive data directly from the sensors 520, the module 522, the camera 530, and the robotic devices and sends data directly to the sensors 520, the module 522, the camera 530, and the robotic devices. The one or more user devices 540, 550 provide the appropriate interfaces/processing to provide visual surveillance and reporting.

In other implementations, the system 500 further includes network 505 and the sensors 520, the module 522, the camera 530, the thermostat 534, and the robotic devices are configured to communicate sensor and image data to the one or more user devices 540 and 550 over network 505 (e.g., the Internet, cellular network, etc.). In yet another implementation, the sensors 520, the module 522, the camera 530, the thermostat 534, and the robotic devices (or a component, such as a bridge/router) are intelligent enough to change the communication pathway from a direct local pathway when the one or more user devices 540 and 550 are in close physical proximity to the sensors 520, the module 522, the camera 530, the thermostat 534, and the robotic devices to a pathway over network 505 when the one or more user devices 540 and 550 are farther from the sensors 520, the module 522, the camera 530, the thermostat 534, and the robotic devices. In some examples, the system leverages GPS information from the one or more user devices 540 and 550 to determine whether the one or more user devices 540 and 550 are close enough to the sensors 520, the module 522, the camera 530, the thermostat 534, and the robotic devices to use the direct local pathway or whether the one or more user devices 540 and 550 are far enough from the sensors 520, the module 522, the camera 530, the thermostat 534, and the robotic devices that the pathway over network 505 is required. In other examples, the system leverages status communications (e.g., pinging) between the one or more user devices 540 and 550 and the sensors 520, the module 522, the camera 530, the thermostat 534, and the robotic devices to determine whether communication using the direct local pathway is possible. If communication using the direct local pathway is possible, the one or more user devices 540 and 550 communicate with the sensors 520, the module 522, the camera 530, the thermostat 534, and the robotic devices using the direct local pathway. If communication using the direct local pathway is not possible, the one or more user devices 540 and 550 communicate with the sensors 520, the module 522, the camera 530, the thermostat 534, and the robotic devices using the pathway over network 505.

In some implementations, the system 500 provides end users with access to images captured by the camera 530 to aid in decision making. The system 500 may transmit the images captured by the camera 530 over a wireless WAN network to the user devices 540 and 550. Because transmission over a wireless WAN network may be relatively expensive, the system 500 uses several techniques to reduce costs while providing access to significant levels of useful visual information.

In some implementations, a state of the monitoring system and other events sensed by the monitoring system may be used to enable/disable video/image recording devices (e.g., the camera 530). In these implementations, the camera 530 may be set to capture images on a periodic basis when the alarm system is armed in an "Away" state, but set not to capture images when the alarm system is armed in a "Stay" state or disarmed. In addition, the camera 530 may be triggered to begin capturing images when the alarm system detects an event, such as an alarm event, a door-opening event for a door that leads to an area within a field of view of the camera 530, or motion in the area within the field of view of the camera 530. In other implementations, the camera 530 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method performed by one or more computers, comprising:
    obtaining, by the one or more computers and from a camera of a monitoring system that is configured to monitor a property, image data that includes a depiction of a human;
    analyzing, by the one or more computers, the image data to determine a set of facial features of the human that are visible;
    based on determining the set of facial features of the human that are visible, determining, by the one or more computers, whether one or more portions of the face of the human are concealed by a covering; and
    in response to determining that one or more portions of the face of the human are concealed by a covering:
        identifying, by the one or more computers, a first type of the covering that is concealing the one or more portions of the face of the human; and
        performing, by the one or more computers, a first monitoring system action using data for the first type of the covering, the first monitoring system action being different from a second monitoring system action for a second, different type of covering.

2. The method of claim 1, wherein determining whether one or more portions of the face of the human are concealed by a covering comprises:
    determining, based on an orientation of a head of the human, a plurality of facial features that are expected to be visible;
    identifying at least one facial feature of the human that (a) is included in the plurality of facial features that are expected to be visible and (b) is not included in the set of facial features of the human that are visible; and
    based on identifying at least one facial feature of the human that (a) is included in the plurality of facial features that are expected to be visible and (b) is not included in the set of facial features of the human that are visible, determining that the one or more portions of the face of the human is concealed by a covering.

3. The method of claim 2, comprising:
    based on identifying the one or more portions of the face of the human that is concealed by the covering, determining an extent of facial concealment of the human; and
    performing the first monitoring system action based at least in part on the extent of facial concealment of the human.

4. The method of claim 1, wherein the first type of the covering and the second, different type of covering each comprises one or more of a full-face mask, a partial-face mask, a scarf, eyewear, a handkerchief, a hat, or a body part.

5. The method of claim 1, wherein identifying the first type of the covering that is concealing the one or more portions of the face comprises:
provided the image data as an input to a model that is configured to identify a type of covering depicted in an image and that is trained using a collection of images that each include a depiction of a type of covering.

6. The method of claim 1, wherein identifying the first type of the covering that is concealing the one or more portions of the face comprises:
providing the image data as input to an object classifier that is configured to classify objects represented in the image data; and
receiving, as output from the object classifier, a classification of an object that is (a) depicted in the image data and (b) concealing the one or more portions of the face of the human.

7. The method of claim 1, wherein the first monitoring system action includes preventing, by the one or more computers, the human from accessing the property.

8. The method of claim 1, wherein the first monitoring system action includes allowing, by the one or more computers, the human to access the property.

9. The method of claim 1, comprising:
receiving, from a sensor located at the property, sensor data; and
performing the first monitoring system action using the sensor data.

10. The method of claim 9, wherein:
the sensor comprises a thermometer; and
the sensor data includes temperature data.

11. The method of claim 1, comprising:
based on determining whether one or more portions of the face of the human are concealed by a covering, determining a malicious intent score that indicates a likelihood that the human has a malicious intent; and
performing the first monitoring system action based at least in part on the malicious intent score.

12. The method of claim 1, wherein determining the set of facial features of the human that are visible comprises determining that no facial features of the human are visible.

13. A system for monitoring a property comprising:
a camera that is configured to generate image data that depicts a portion of the property; and
one or more computers configured to perform operations comprising:
obtaining, by the one or more computers and from the camera, image data that includes a depiction of a human;
analyzing, by the one or more computers, the image data to determine a set of facial features of the human that are visible;
based on determining the set of facial features of the human that are visible, determining, by the one or more computers, whether one or more portions of the face of the human are concealed by a covering; and
in response to determining whether one or more portions of the face of the human are concealed by a covering:
identifying, by the one or more computers, a first type of the covering that is concealing the one or more portions of the face of the human; and
performing, by the one or more computers, a first monitoring system action using data for the first type of the covering, the first monitoring system action being different from a second monitoring system action for a second, different type of covering.

14. The system of claim 13, wherein determining whether one or more portions of the face of the human are concealed by a covering comprises:
determining, based on an orientation of a head of the human, a plurality of facial features that are expected to be visible;
identifying at least one facial feature of the human that (a) is included in the plurality of facial features that are expected to be visible and (b) is not included in the set of facial features of the human that are visible; and
based on identifying at least one facial feature of the human that (a) is included in the plurality of facial features that are expected to be visible and (b) is not included in the set of facial features of the human that are visible, determining that the one or more portions of the face of the human is concealed by a covering.

15. The system of claim 14, wherein the one or more computers are configured to perform operations comprising:
based on identifying the at least one facial feature of the human that is concealed by the covering, determining an extent of facial concealment of the human; and
performing the first monitoring system action based at least in part on the extent of facial concealment of the human.

16. The system of claim 14, wherein the one or more computers are configured to identify one or more coverings that are concealing the at least one facial feature of the human.

17. A non-transitory computer-readable medium storing software comprising instructions executable by one or more computers which, upon such execution, cause the one or more computers to perform operations comprising:
obtaining, by the one or more computers and from a camera of a monitoring system that is configured to monitor a property, image data that includes a depiction of a human;
analyzing, by the one or more computers, the image data to determine a set of facial features of the human that are visible;
based on determining the set of facial features of the human that are visible, determining, by the one or more computers, whether one or more portions of the face of the human are concealed by a covering; and
in response to determining that one or more portions of the face of the human are concealed by a covering:
identifying, by the one or more computers, a first type of the covering that is concealing the one or more portions of the face of the human; and
performing, by the one or more computers, a first monitoring system action using data for the first type of the covering, the first monitoring system action being different from a second monitoring system action for a second, different type of covering.

18. The non-transitory computer-readable medium of claim 17, wherein determining whether one or more portions of the face of the human are concealed by a covering comprises:
determining, based on an orientation of a head of the human, a plurality of facial features that are expected to be visible;
identifying at least one facial feature of the human that (a) is included in the plurality of facial features that are epected to be visible and (b) is not included in the set of facial features of the human that are visible; and based on identifying at least one facial feature of the human that (a) is included in the plurality of facial features that are expected to be visible and (b) is not included in the set of facial features of the human that are visible, determining that the one or more portions of the face of the human is concealed by a covering.

19. The non-transitory computer-readable medium of claim 18, the operations comprising:

based on identifying the one or more portions of the face of the human that is concealed by the covering, determining an extent of facial concealment of the human; and performing the first monitoring system action based at least in part on the extent of facial concealment of the human.

20. The non-transitory computer-readable medium of claim 17, wherein identifying the first type of the covering that is concealing the one or more portions of the face comprises:

providing the image data as an input to a model that is configured to identify a type of covering depicted in an image and that is trained using a collection of images that each include a depiction of a tyupe of covering.

* * * * *

UNITED STATES PATENT AND TRADEMARK OFFICE
CERTIFICATE OF CORRECTION

PATENT NO. : 11,978,256 B2
APPLICATION NO. : 17/205071
DATED : May 7, 2024
INVENTOR(S) : Donald Madden et al.

Page 1 of 1

It is certified that error appears in the above-identified patent and that said Letters Patent is hereby corrected as shown below:

In the Claims

In Claim 18, Column 34, Line 66, delete "epected" and insert -- expected --.

In Claim 20, Column 35, Line 23, delete "tyupe" and insert -- type --.

Signed and Sealed this
Tenth Day of December, 2024

Katherine Kelly Vidal
*Director of the United States Patent and Trademark Office*